United States Patent
Bae et al.

(10) Patent No.: US 11,683,808 B2
(45) Date of Patent: *Jun. 20, 2023

(54) METHOD FOR TRANSMITTING OR RECEIVING PUCCH CARRYING SR IN WIRELESS COMMUNICATION SYSTEM AND APPARATUS THEREFOR

(71) Applicant: LG Electronics Inc., Seoul (KR)

(72) Inventors: Duckhyun Bae, Seoul (KR); Yunjung Yi, Seoul (KR); Inkwon Seo, Seoul (KR); Soonki Jo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,802

(22) Filed: Jul. 29, 2022

(65) Prior Publication Data

US 2022/0394706 A1 Dec. 8, 2022

Related U.S. Application Data

(63) Continuation of application No. 16/871,519, filed on May 11, 2020, now Pat. No. 11,470,587, which is a
(Continued)

(51) Int. Cl.
*H04W 72/21* (2023.01)
*H04L 5/00* (2006.01)
(Continued)

(52) U.S. Cl.
CPC ............ *H04W 72/21* (2023.01); *H04L 5/0053* (2013.01); *H04W 72/04* (2013.01); *H04W 72/0446* (2013.01)

(58) Field of Classification Search
CPC ......... H04W 72/0406; H04W 72/1284; H04W 72/0446; H04W 72/21; H04L 1/1614; H04L 5/0083; H04L 5/0073; Y02D 30/70
See application file for complete search history.

(56) References Cited

U.S. PATENT DOCUMENTS

2017/0086219 A1 3/2017 Lee et al.
2018/0368169 A1* 12/2018 Jung .................... H04L 1/1861
(Continued)

FOREIGN PATENT DOCUMENTS

CN 103098536 5/2013
CN 107078888 8/2017

OTHER PUBLICATIONS

Intel Corporation, "UL data transmission procedures in NR," R1-1717396, 3GPP TSG RAN WG1 Meeting 90bis, Prague, Czech Republic, Oct. 9-13, 2017, 12 pages.
(Continued)

*Primary Examiner* — Omer S Mian
(74) *Attorney, Agent, or Firm* — Fish & Richardson P.C.

(57) ABSTRACT

Systems and techniques for transmitting a physical uplink control channel (PUCCH) carrying a scheduling request (SR) in a wireless communication system. In some implementations, a method performed by a terminal includes the steps of: receiving, from a base station, a first message related to configuration of an uplink (UL) resource; receiving, from the base station, a second message related to resource configuration of a PUCCH carrying the SR; determining a resource for transmission of the PUCCH carrying the SR; and transmitting, to the base station, the PUCCH carrying the SR on the determined resource.

11 Claims, 10 Drawing Sheets

Related U.S. Application Data continuation of application No. PCT/KR2018/013715, filed on Nov. 12, 2018.

(60) Provisional application No. 62/658,548, filed on Apr. 16, 2018, provisional application No. 62/636,134, filed on Feb. 27, 2018, provisional application No. 62/630,317, filed on Feb. 14, 2018, provisional application No. 62/622,080, filed on Jan. 25, 2018, provisional application No. 62/617,081, filed on Jan. 12, 2018, provisional application No. 62/595,064, filed on Dec. 5, 2017, provisional application No. 62/588,159, filed on Nov. 17, 2017, provisional application No. 62/587,453, filed on Nov. 16, 2017, provisional application No. 62/584,116, filed on Nov. 10, 2017.

(51) Int. Cl.
*H04W 72/0446* (2023.01)
*H04W 72/04* (2023.01)

(56) References Cited

U.S. PATENT DOCUMENTS

| | | | |
|---|---|---|---|
| 2019/0053211 A1* | 2/2019 | Ying | H04W 72/14 |
| 2020/0275431 A1* | 8/2020 | Bae | H04W 72/0413 |

OTHER PUBLICATIONS

LG Electronics Inc., "Proposed Scheduling Request (SR) structure and multiplexing with PUCCH," R1-073485, 3GPP TSG RAN WG1 #50, Athens, Greece, Aug. 20-24, 2007, 6 pages.

LG Electronics, "Details on SR, SRS, and SPS transmission for MTC UE," R1-156848, Presented at 3GPP TSG RAN WG1 Meeting #83, Anaheim, USA, Nov. 15-22, 2015, 6 pages.

Nokia & Nokia Shanghai Bell, "Remaining details of Long PUCCH with small UCI payload," R1-1718307, 3GPP TSG-RAN WG1 #90bis, Prague, Czech Republic, Oct. 9-13, 2017, 8 pages.

Office Action in Chinese Appln. No. 201880085090.5, dated Aug. 26, 2022, 19 pages (with English translation).

Yanzhou, "Research of scheduling procedure in LTE system," Electronic Test, May 2010, 5:6-35.

* cited by examiner

FIG. 8
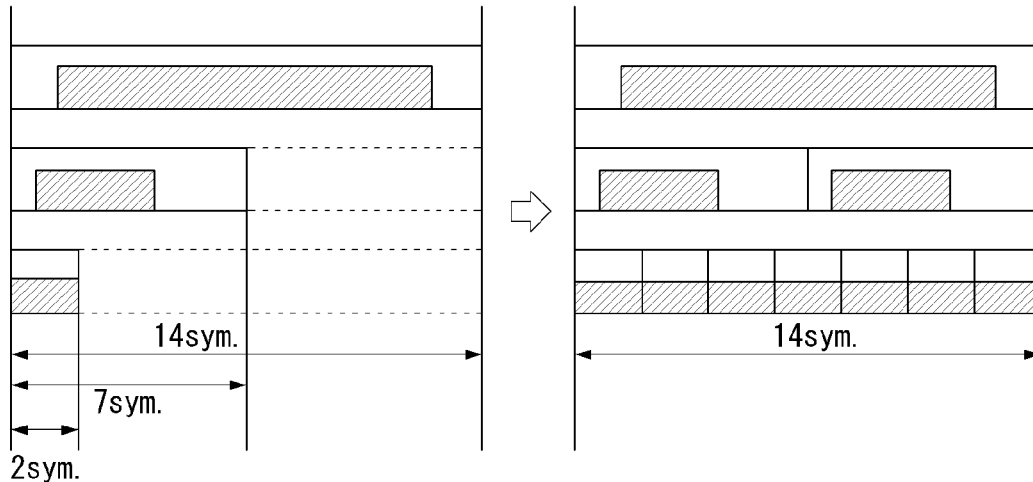
FIG. 9
· Behavior 1: Drop TO and transmission
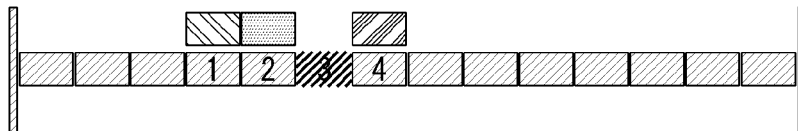
· Behavior 2: Skip TO and postpone transmission
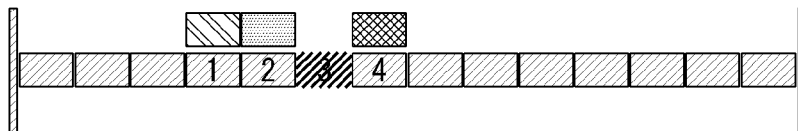
· Behavior 3: Postpone TO transmission
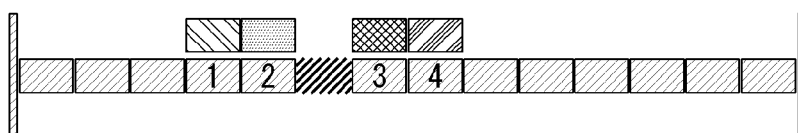
▯ Slot boundary
▨ Symbol
N Nth TO
▨ Cancelled Symbol
▨ 1st repetition
▨ 2nd repetition
▨ 3th repetition
▨ 4th repetition FIG. 10
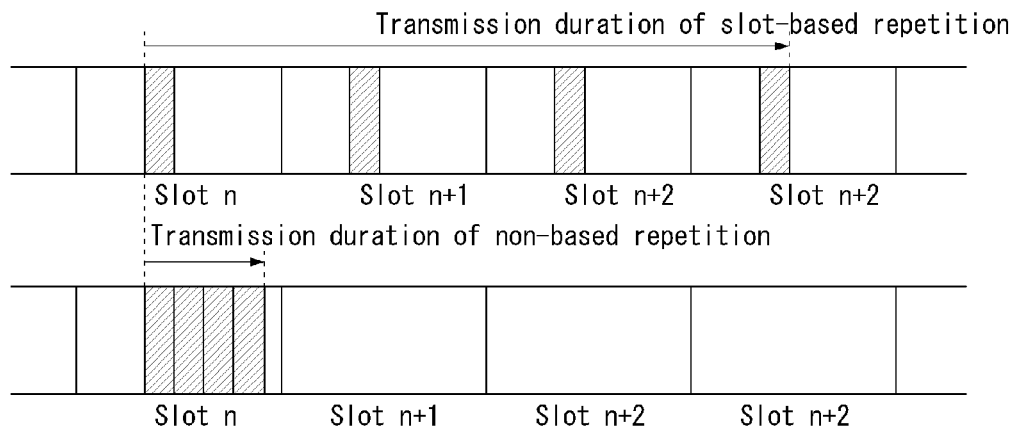
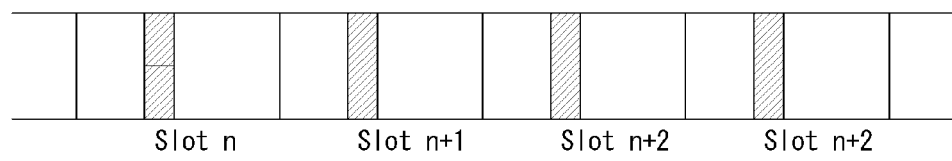
FIG. 11A
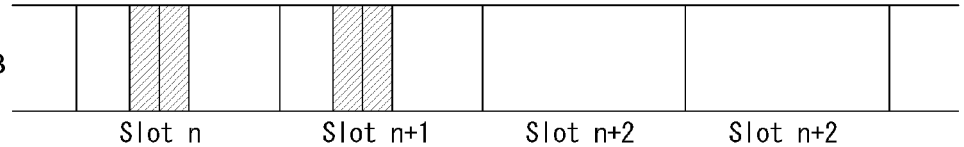
FIG. 11B
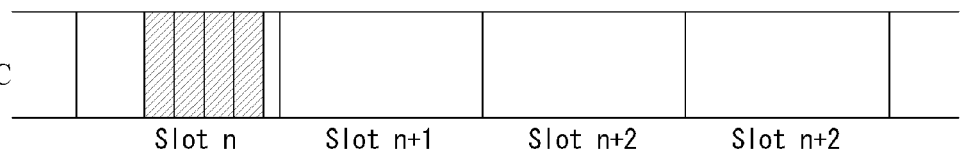
FIG. 11C
FIG. 11D

METHOD FOR TRANSMITTING OR RECEIVING PUCCH CARRYING SR IN WIRELESS COMMUNICATION SYSTEM AND APPARATUS THEREFOR

CROSS-REFERENCE TO RELATED APPLICATIONS

This application is a continuation of U.S. application Ser. No. 16/871,519, filed on May 11, 2020, which is a continuation pursuant to 35 U.S.C. § 119(e) of International Application PCT/KR2018/013715, with an international filing date of Nov. 12, 2018, which claims the benefit of U.S. Provisional Patent Application Nos. 62/658,548, filed on Apr. 16, 2018, 62/636,134, filed Feb. 27, 2018, 62/630,317, filed on Feb. 14, 2018, 62/622,080, filed on Jan. 25, 2018, 62/617,081, filed on Jan. 12, 2018, 62/595,064, filed on Dec. 5, 2017, 62/588,159, filed on Nov. 17, 2017, 62/587,453, filed on Nov. 16, 2017, and 62/584,116, filed on Nov. 10, 2017, the contents of which are hereby incorporated by reference herein in their entirety.

TECHNICAL FIELD

The present disclosure generally relates to a wireless communication system, and more specifically, to communicating a physical uplink control channel (PUCCH) carrying a scheduling request (SR).

BACKGROUND

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication systems are largely to accommodate the explosive data traffic, the per-user transmission mobile communication system has been developed to provide voice services while ensuring the user's activity. However, the mobile communication system has expanded not only voice but also data service, and the explosive increase in traffic causes shortage of resources and users require higher speed services.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

Implementations of the present disclosure provide systems and techniques for determining a PUCCH resource for a scheduling request (SR) when the period of a PUCCH related to an SR is smaller than one slot.

It is to be understood that technical objects to be achieved by the present disclosure are not limited to the aforementioned technical object and other technical objects which are not mentioned herein will be apparent from the following description to one of ordinary skill in the art to which the present disclosure pertains.

According to the disclosure, there is provided a method for transmitting a physical uplink control channel (PUCCH) carrying a scheduling request (SR) in a wireless communication system.

Specifically, a method performed by a user equipment (UE) comprises receiving a first message for a configuration of an uplink (UL) resource from a base station, the first message including first information for a symbol level offset of UL transmission, receiving a second message for a resource configuration of the PUCCH from the base station, the second message including second information for a periodicity and offset for the transmission of the PUCCH, determining a resource for the transmission of the PUCCH based on the first information and the second information, and transmitting the PUCCH to the base station over the determined resource, wherein when the transmission periodicity of the PUCCH is smaller than one slot, a symbol at which the transmission of the PUCCH starts is a value of the first information.

Further, in the disclosure, when a specific slot has an insufficient number of symbols available for the transmission of the PUCCH, the PUCCH is not transmitted in the specific slot.

Further, in the disclosure, the periodicity of the PUCCH is 2 symbols or 7 symbols.

Further, in the disclosure, the PUCCH is PUCCH format 0 or PUCCH format 1.

Further, in the disclosure, a position of the symbol at which the transmission of the PUCCH starts is set to differ per slot.

Further, according to the disclosure, a UE for transmitting a physical uplink control channel (PUCCH) carrying a scheduling request (SR) in a wireless communication system comprises a radio frequency (RF) module for transmitting/receiving a radio signal and a processor functionally connected with the RF module, wherein the processor receives a first message for a configuration of an uplink (UL) resource from a base station, the first message including first information for a symbol level offset of UL transmission, receives a second message for a resource configuration of the PUCCH from the base station, the second message including second information for a periodicity and offset for the transmission of the PUCCH, determines a resource for the transmission of the PUCCH based on the first information and the second information, and transmits the PUCCH to the base station over the determined resource, wherein when the transmission periodicity of the PUCCH is smaller than one slot, a symbol at which the transmission of the PUCCH starts is a value of the first information.

According to the disclosure, an SR resource may be allocated by the base station or selected by the UE without interfering with other UEs regardless of whether the dynamic TDD configuration transmission by the base station succeeds or not.

According to the disclosure, a mini-slot or symbol-level SR reception may be allocated without invading the slot boundary.

It will be appreciated by those skilled in the art that the effects that can be achieved with the present disclosure are not limited to what has been described above and other advantages of the present disclosure will be clearly understood from the following detailed description taken in conjunction with the accompanying drawings.

BRIEF DESCRIPTION OF DRAWINGS

FIG. 8 illustrates an example of another implementation according to the present disclosure;

FIG. 9 illustrates an example of an operation of a UE for repetition/aggregation according to implementations of the present disclosure;

FIG. 10 illustrates an example which shows a difference, in terms of latency, between slot repetition and non-slot repetition according to implementations of the present disclosure;

FIGS. 11A to 11D illustrate an example of slot level repetition according to implementations of the present disclosure;

DETAILED DESCRIPTION

Figure 1:
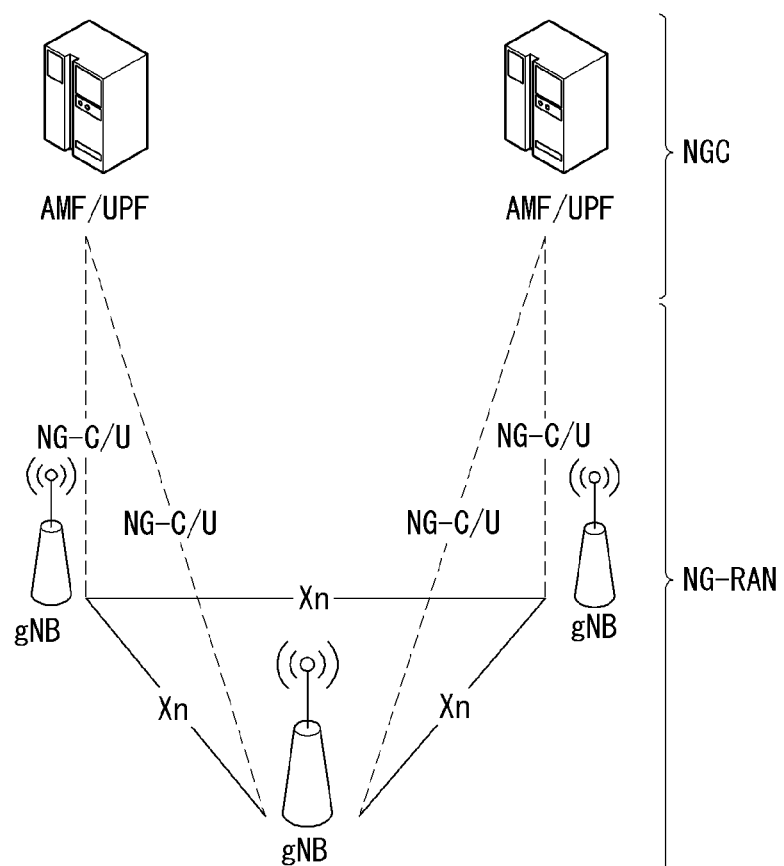
FIG. 1 illustrates an example of an overall structure of a new radio (NR) system according to some implementations of the present disclosure.

Some implementations of the present disclosure are described in detail with reference to the accompanying drawings. A detailed description to be disclosed along with the accompanying drawings is intended to describe some exemplary implementations of the present disclosure and is not intended to describe a sole implementation of the present disclosure. The following detailed description includes more details in order to provide full understanding of the present disclosure. However, those skilled in the art will understand that the present disclosure may be implemented without such more details.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Implementations of the present disclosure may be supported by the standard documents disclosed in at least one of IEEE 802, 3GPP, or 3GPP2, that is, radio access systems. That is, one or more features or portions of the implementations of the present disclosure may be implemented in accordance with such standard documents, even if those specific features or portions are not expressly disclosed herein. Furthermore, terms that are used in this document may be described by the standard documents.

In the implementations described herein, 3GPP LTE/LTE-A/New RAT (NR) is chiefly described, but the technical characteristics of the present disclosure are not limited thereto.

As propagation of smart phones and Internet of things (IoT) terminals rapidly spreads, the amount of information which is transmitted and received through a communication network increases. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this specification, for easy description, the next-generation wireless access technology is referred to as a new radio access technology (RAT) (NR) radio access technology and the wireless communication system to which the NR is applied is referred to as an NR system.

Explanation of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 illustrates an example of an overall structure of a new radio (NR) system according to some implementations of the present disclosure.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

Figure 2:
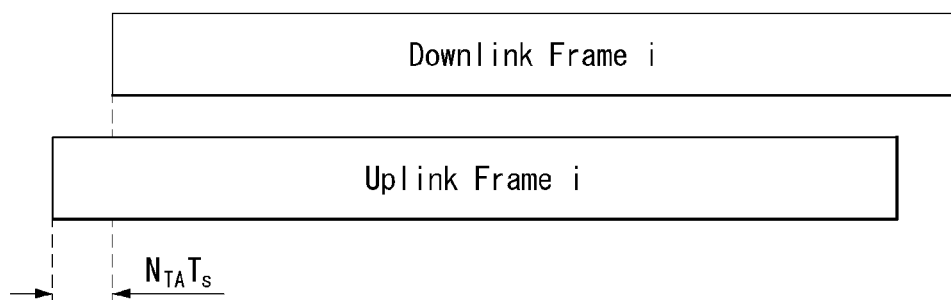
FIG. 2 illustrates an example of a relationship between an uplink (UL) frame and a downlink (DL) frame in a wireless communication system according to some implementations of the present disclosure.

FIG. 2 illustrates an example of a relationship between an uplink (UL) frame and a downlink (DL) frame in a wireless communication system according to some implementations of the present disclosure.

As illustrated in FIG. 2, a UL frame number I from a User Equipment (UE) needs to be transmitted $T_{TA} = T_{TA} T_s$ before the start of a corresponding DL frame in the UE.

Regarding the numerology μ, slots are numbered in ascending order of $n_s^\mu \in \{0, \ldots, N_{subframe}^{slots,\mu} - 1\}$ in a subframe, and in ascending order of $n_{s,f}^\mu \in \{0, \ldots, N_{frame}^{slots,\mu} - 1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number ($N_{symb}^{slot}$) of OFDM symbols per slot, the number slot ($N_{slot}^{frame,\mu}$) of slots per radio frame, and the number ($N_{slot}^{subframe,\mu}$) of slots per subframe in normal CP, and Table 3 shows the number of OFDM symbols per slot, the number of slots per radio frame, and the number of slots per subframe in extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 2-continued

| $\mu$ | $N^{slot}_{symb}$ | $N^{frame,\mu}_{slot}$ | $N^{subframe,\mu}_{slot}$ |
|---|---|---|---|
| 3 | 14 | 80 | 8 |
| 4 | 14 | 160 | 16 |

TABLE 3

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

Figure 3:
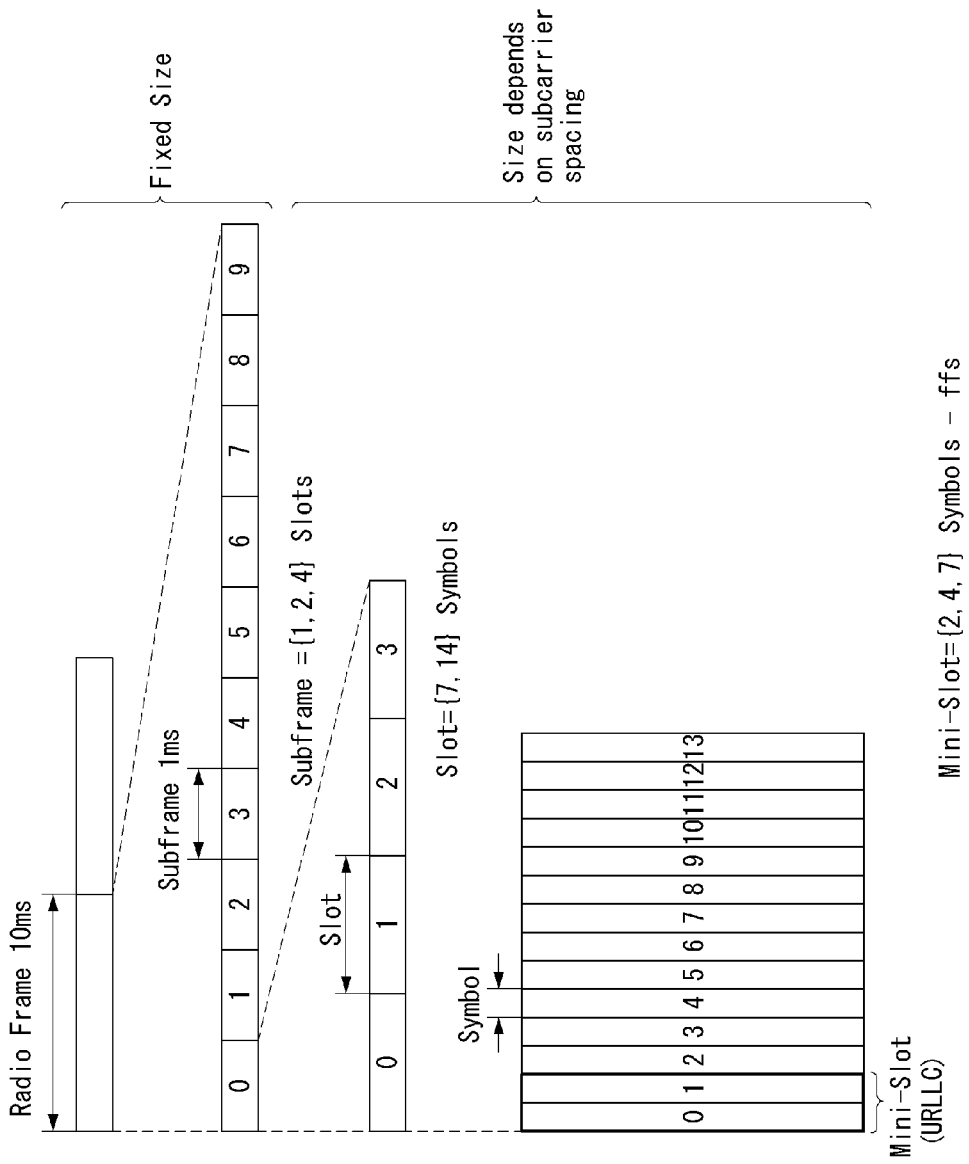
FIG. 3 illustrates an example of a frame structure in an NR system.

FIG. 3 illustrates an example frame structure in an NR system. FIG. 3 is intended merely for illustration purposes but not for limiting the scope of the disclosure.

Table 3 represents an example where μ=2, i.e., the subcarrier spacing (SCS) is 60 kHz. Referring to Table 2, one subframe (or frame) may include four slots. The "1 subframe={1,2,4} slots" in FIG. 3 is an example, and the number of slots that may be included in one subframe may be defined as shown in Table 2.

The mini-slot may consist of 2, 4, or 7 symbols or more or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Frequency shift, average received power, and Received Timing.

Figure 4:
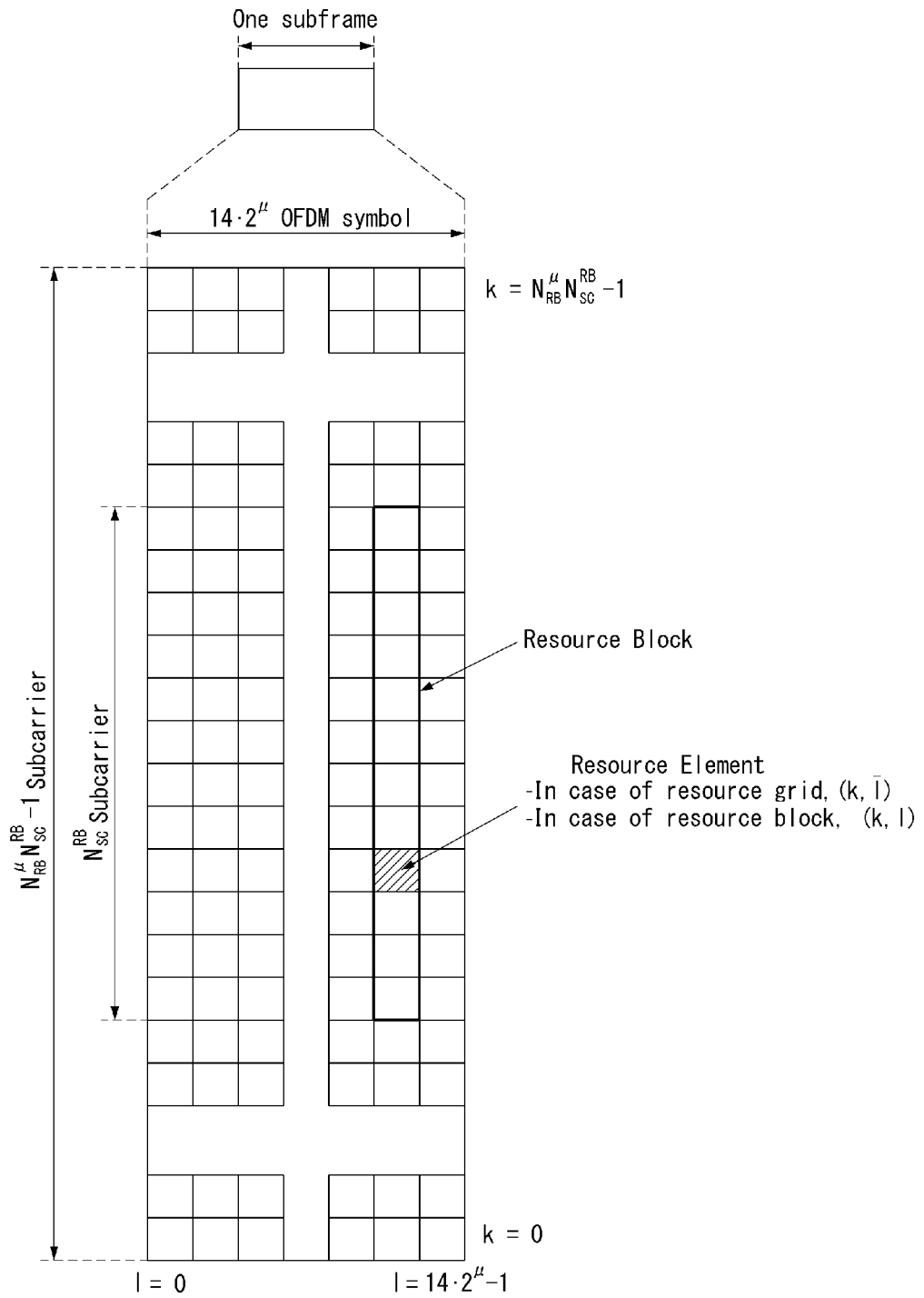
FIG. 4 illustrates an example of a resource grid supported in a wireless communication system according to implementations of the present disclosure.

FIG. 4 illustrates an example of a resource grid supported in a wireless communication system according to implementations of the present disclosure.

Referring to FIG. 4, a resource grid is composed of $N_{RB}^{\mu} N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 5:
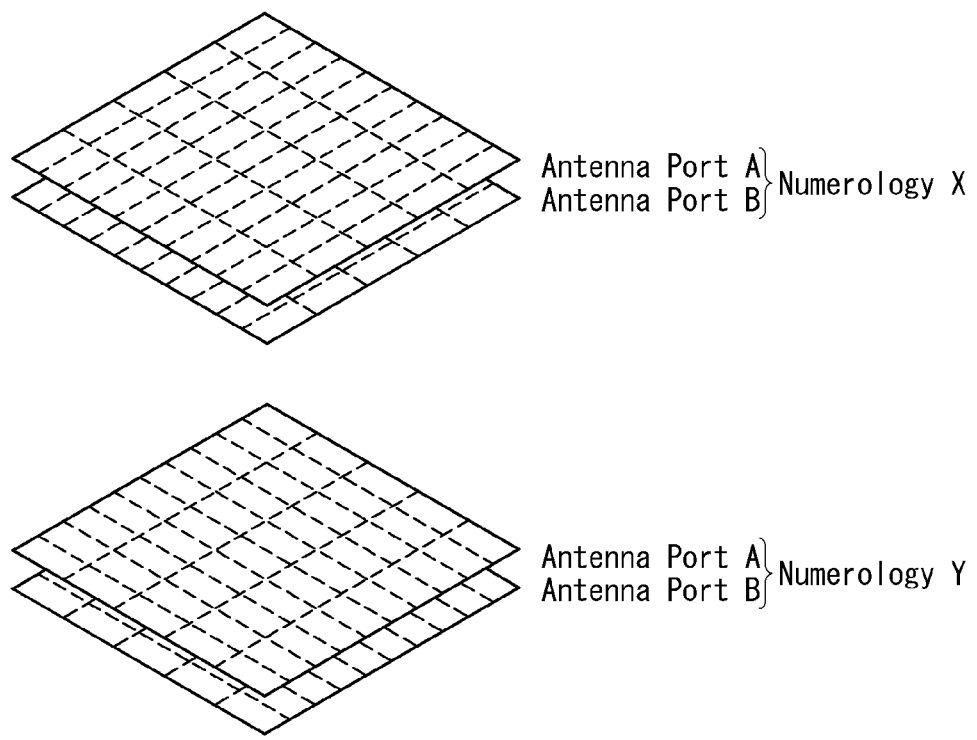
FIG. 5 illustrates examples of resource grids for each antenna port and numerology according to implementations of the present disclosure.

In this case, as illustrated in FIG. 5, one resource grid may be configured for the numerology μ and an antenna port p.

FIG. 5 illustrates examples of resource grids for each antenna port and numerology according to implementations of the present disclosure.

Each element of the resource grid for the numerology μ and the antenna port p is indicated as a resource element, and may be uniquely identified by an index pair (k, l̄). Herein, k=0 . . . , $N_{RB}^{\mu} N_{sc}^{RB}-1$ is an index in the frequency domain, and l̄=0, . . . , $2^{\mu}N_{symb}^{(\mu)}-1$ indicates a location of a symbol in a subframe. To indicate a resource element in a slot, the index pair (k, l) is used. Herein, l=0, . . . , $N_{symb}^{\mu}-1$.

The resource element (k, l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

The physical resource block is defined with $N_{sc}^{RB}=12$ consecutive subcarriers in the frequency domain.

Point A plays a role as a common reference point of the resource block grid and may be obtained as follows.

offsetToPointA for PCell downlink refers to the frequency offset between point A and the lowest subcarrier of the lowest resource block overlapping the SS/PBCH block used by the UE for initial cell selection and is represented with resource block units assuming a subcarrier interval of 15 kHz for FR1 and a subcarrier interval of 60 kHz for FR2;

absoluteFrequencyPointA refers to the frequency-position of point A expressed as in the absolute radio-frequency channel number (ARFCN).

The common resource blocks are numbered up from zero in the frequency domain for subcarrier spacing configuration μ.

The center of subcarrier 0 of common resource block 0 for subcarrier spacing configuration μ matches 'point A.'. In the frequency domain, resource elements (k,l) for common resource block number $n_{CRB}^{\mu}$ and subcarrier spacing configuration μ may be given as Equation 1 below.

$$n_{CRB}^{\mu} = \left\lfloor \frac{k}{N_{sc}^{RB}} \right\rfloor \quad \text{Equation 1}$$

Here, k may be defined relative to point A so that k=0 corresponds to the subcarrier with point A centered. The physical resource blocks are numbered from 0 to $N_{BWP,i}^{size}-1$ in the bandwidth part (BWP), and i is the number of the BWP. In BWP i, the relationship between physical resource block $n_{PRB}$ and common resource block $n_{CRB}$ may be given as Equation 2 below.

$$n_{CRB}=n_{PRB}+N_{BWP,i}^{start} \quad \text{Equation 2}$$

Here, $N_{BWP,i}^{start}$ may be common resource blocks in which the BWP starts relative to common resource block 0.

Self-Included Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-included structure or a self-included slot.

Figure 6:
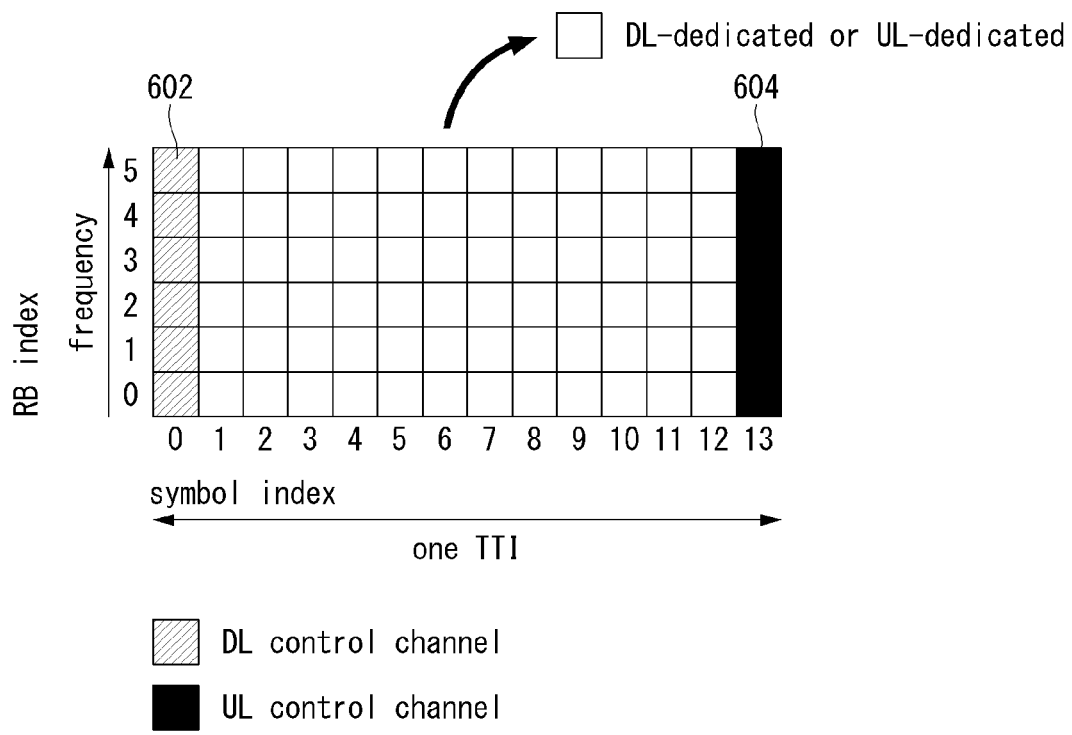
FIG. 6 illustrates an example of a self-included structure according to implementations of the present disclosure.

FIG. 6 illustrates one example of a self-included structure according to implementations of the present disclosure. FIG. 6 is shown as an example, and does not limit the scope of the present disclosure.

Referring to FIG. 6, it is assumed that one transmission unit (e.g., slot or subframe) is constituted by 14 orthogonal frequency division multiplexing (OFDM) symbols as in legacy LTE.

In FIG. 6, a region 602 refers to a downlink control region and a region 604 refers to an uplink control region. Further, a region (that is, a region without a separate indication) other than the regions 602 and 604 may be used for transmitting downlink data or uplink data.

That is, uplink control information and downlink control information may be transmitted in one self-included slot. On the contrary, in the case of data, the uplink data or downlink data may be transmitted in one self-included slot.

When the structure illustrated in FIG. 6 is used, in one self-included slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data delivery may be minimized.

In the self-included slot structure illustrated in FIG. 6, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-included slot, some OFDM symbol(s) may be configured as a guard period (GP).

Analog Beamforming

In a millimeter wave (mmWave, mmW) communication system, as the wavelength of the signal becomes shorter, multiple (or multiplex) antennas may be installed in the same area. For example, in a 30 CHz band, the wavelength is approximately 1 cm, and when antennas are installed at an interval of 0.5 lambda in a panel of 5 cm×5 cm according to a two-dimensional arrangement form, a total of 100 antenna elements may be installed.

Accordingly, in the mmW communication system, a method for increasing coverage or increasing the throughput by increasing a beamforming (BF) gain using multiple antenna elements or increasing a throughput may be considered.

In this case, when a transceiver unit (TXRU) is installed so as to adjust transmission power or a phase for each antenna element, independent beamforming is possible for each frequency resource.

However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered.

The aforementioned analog beamforming method may generate only one beam direction in all bands, so that a frequency selective beam operation may not be performed.

As a result, hybrid beamforming with B TXRUs that are fewer than Q antenna elements, in the form of an intermediate form of digital beamforming and analog beamforming, may be considered. In this case, although there is a difference depending on a connection method of B TXRUs and Q antenna elements, the number of directions of the beams that may be transmitted at the same time is limited to B or less.

Described below are techniques for allocating a resource for a scheduling request (SR) according to implementations of the present disclosure, and techniques for using the allocated SR resource when dynamic TDD is used.

First, an overview related thereto is given.

Since SR configurations are semi-static configurations, a problem may arise when an SR opportunity (or SR occasion) is configured to occur in a particular symbol in a slot which is inconsistent with the TDD slot format. For example, because an SR transmission is an uplink transmission by the UE, a problem may arise if an SR opportunity (or SR occasion) is configured to occur in a non-uplink symbol (e.g., as indicated in the slot format which was indicated in dynamic SFI/semi-static DL/UL allocation). Implementations disclosed herein may help address and resolve such problem scenarios.

The dynamic TDD operation needs to be clarified particularly based on the dynamic SFI in which the UE may transmit an SR.

Upon applying the periodicity and offset of an SR configuration, the following options may be considered in counting the periodicity and/or offset.

Option 1: Counts only fixed uplink resources configured semi-statically.

Option 2: Counts only fixed and flexible ULs configured semi-statically.

Option 3: The periodicity and offset apply to the number of slots/OFDM symbols regardless of the actual resource type.

Although option 1 has no ambiguity, since SR opportunity may occur only in semi-static UL resources, option 1 has low flexibility.

In option 3, the periodicity and offset in the configuration means the absolute time. Adjusting the periodicity may be helpful in achieving the target latency. However, if the UE has a larger periodicity, the gNB, it is hard to allocate a UL slot/mini-slot/symbol at an appropriate time.

Option 2 provides more flexibility than the other options. In this case, SR opportunity may occur in the semi-static UL and flexible resource.

However, where option 2 is used, some extra descriptions are required of the cases of being shorter than the slot level periodicity.

Since each slot may have a different number of UL/flexible symbols, this is difficult to apply in a smaller periodicity than the slot periodicity.

Given these, the following methods may be taken into consideration.

Method 1

A choice is made among the following options.

Option 1: Option 3 is considered regardless of the slot or mini-slot level periodicity.

Option 2: In the case of slot level periodicity/offset, option 2 is chosen and, in the case of being less than the slot level periodicity, option 3 is adopted.

When option 2 is considered, the UL/flexible slot in which the PUCCH configured for an SR is regarded as a valid UL slot.

When option 3 is considered, such an occasion may occur where it is impossible to transmit an SR.

First, the slot or resource may be a DL resource or there are no sufficient UL/flexible resources to transmit a PUCCH configured for SR transmission.

In this case, SR transmission needs to be postponed to a next available SR occasion or next available PUCCH/PUSCH transmission which may be piggybacked to the SR.

Method 2

In method 2, if the resource is DL or reserved at an SR occasion, the SR is not transmitted.

In this case, the SR may be transmitted at a next available SR occasion or during next available PUCCH/PUSCH transmission.

The higher layer needs to be notified of dropped SRs.

Method 3

If there are not sufficient UL/flexible resources to transmit the PUCCH configured for the SR at an SR occasion, the SR is not transmitted.

The SR may be transmitted at a next available SR occasion or during next available PUCCH/PUSCH transmission. The higher layer needs to be notified of dropped SRs.

A scheduling request may be configured in the periodicity of symbol level.

Although a symbol level periodicity is set, it is not preferable to map the SR PUCCH to the slot boundary.

One way to leave the slot level in the periodicity of symbol level is to drop the SR PUCCHs departing off the slot boundary.

Although this method has merits in the case of dynamic TDD, it is required to discuss a method of allocating a PUCCH resource in the symbol level without considering slots.

Another way is to use an SR pattern in the slot.

An SR occasion pattern has a symbol level periodicity in the slot.

It is possible to obtain the periodicity of symbol level without breaking the slot boundary by repeating the corresponding slot on all the slots.

In this option, a PUCCH allocation method agreed on other UCIs such as HARQ-ACK may be reused.

Method 4: Upon configuring an SR with a periodicity shorter than the slot

An SR configuration has an SR occasion pattern for the slot.

All the slots have the same SR occasion pattern.

If option 1 is preferred in defining an SR occasion pattern, the following options may be considered.

Method 1-1

In method 1-1, only one PUCCH resource is indicated in the SR configuration for the first SR occasion in the slot.

Other SR occasions in the slot are implicitly indicated by repetition of the PUCCH resource having a given periodicity.

Method 1-2

In method 1-2, the PUCCH resource for all the SR occasions in the slot are explicitly indicated in the SR configuration.

A method of allocating a resource for a scheduling request (SR) and a method of using the allocated SR resource when dynamic TDD is used are described below in detail in connection with various implementations thereof.

The following implementations may be performed independently or in combination.

First Implementation

The first implementation regards techniques for SR resource determination for dynamic TDD.

In general, a scheduling request (SR) is a request by a UE for an allocation of uplink resources that can be used by the UE to perform an uplink transmission. Thus, the UE transmits a scheduling request (SR) to the base station in order to receive, from the base station, an allocation of a resource for a new uplink transmission that will be performed by the UE.

When the UE transmits such an SR, the SR resource that is used by the UE is a semi-static uplink (UL) resource. In some scenarios, a problem may arise in that the semi-static UL resource may differ from the DL/UL assignment of resources that is dynamically changed. For example, the SR resource (which is semi-statically configured) to be used by the UE to send the uplink SR request may occur in a symbol that is configured (by a dynamically changed UL/DL resource assignment) to be a non-uplink symbol.

As such, a problem may arise if the UE incorrectly determines the transmission direction of a resource (e.g., due to a dynamically changed DL/UL resource) for the semi-static resource (e.g., if the UE determines that a downlink region should be used for the uplink SR request). In such problem scenarios, the UE's uplink SR transmission could interfere with other UEs.

Thus, a need exists for techniques of allowing the UE to use the SR resource without influencing other UEs, even if scenarios where the UE fails to properly receive the dynamic TDD UL/DL resource configuration.

Although PUCCH configuration for SR transmission is described below, the techniques disclosed herein may also apply to the PUCCH, PDCCH, PDSCH, or PUSCH for other purposes.

In new RAT (or NR), TDD configuration may be transmitted to the UE in various manners.

First, the base station may allocate a TDD configuration to the UE using semi-static signaling, e.g., higher layer signaling.

Or, the base station may perform dynamic TDD configuration on the UE via layer 1 (L1) signaling.

The dynamic TDD configuration may not be transferred to the UE via L1 signaling.

Thus, the UE needs to operate without any trouble although failing to receive the dynamic TDD configuration.

The symbol, slot, or mini-slot may be expressed as having a state, e.g., DL, UL, or flexible/unknown via the semi-static TDD configuration and, according to the state, the TDD configuration may be overridden via L1 signaling.

In the disclosure, the symbol "/" may be interpreted as "and/or," and the phrase "A and/or B" may be interpreted as "including at least one of A or (and/or) B."

The SR resource for the UE's SR transmission typically has periodicity and is allocated by the base station via higher layer signaling.

As set forth above, the SR resource is a periodic UL resource and may differ from the TDD configuration changed dynamically or semi-statically.

Such a mismatch may hamper the UE's SR transmission, causing latency or significantly interfering with other UEs.

Thus, as described above, implementations of the present disclosure describe an SR resource configuration technique as follows, to address a mismatch between TDD configuration and SR resource configuration in new RAT.

(Method 1)

Method 1 is a configuration method that allows the SR resource of the SR configuration to be present only in the UL resource of the semi-static TDD configuration all the time.

Since the UL resource allocated semi-statically is not influenced by dynamic TDD configuration, SR transmission may be performed using the semi-static UL resource alone.

More specifically, the semi-static configuration may mean only cell-specific DL/UL configuration or both cell-specific and UE-specific configurations.

At this time, the following method may be further considered.

(Method 1-1)

Method 1-1 considers only semi-static UL resource previously allocated with the periodicity and offset of the SR resource.

Specifically, method 1-1 may apply the periodicity and offset of the SR resource configuration using the logical index considering only the semi-static UL resource.

For example, this may mean that, where the periodicity of the SR resource is 'K,' an SR opportunity (or occasion) occurs every K semi-static UL slots/mini-slots.

(Method 1-2)

Method 1-2 may regard the SR configuration as semi-static TDD configuration.

At this time, the symbol/slot/mini-slot used as SR resource may be regarded as semi-static UL resource.

(Method 1-3)

In method 1-3, SR transmission may be skipped at an occasion other than UL by semi-static TDD configuration.

Upon SR triggering in the corresponding resource, the SR may be transmitted in the fastest available resource.

The fastest available resource may be determined by the following options.

The fastest available resource may include the current occasion and, if transmission is rendered possible by the following options, this means that it is not skipped.

In other words, the following options are intended for selecting the resource of SR transmission and includes the resource of the current occasion.

transmits at the fastest next SR occasion according to semi-static DL/UL configuration.

may assume the first SR occasion among resources dynamically available, such as dynamic slot format indicator (SFI), dynamic scheduling, PUCCH scheduling, or PUSCH scheduling.

the PUCCH resource is rendered available by dynamic scheduling (additionally considering piggyback by PUSCH scheduling), or transmits in the fastest UL resource by semi-static DL/UL configuration.

where SR transmission is skipped, whether the SR occasion is skipped may be known to the higher layer.

The above options may be applied differently depending on whether the SR periodicity is a multiple of the slot or a multiple of the symbol.

As an example, in the case of the slot, the periodicity of the SR resource may be set by counting the UL slots or UL-centric slots, or in the case of the symbol, method 1-3 may be applied.

Or, which way to apply may be configured in the SR configuration.

(Method 2)

Method 2 relates to regarding the SR resource of SR configuration as semi-static unknown resource.

Specifically, the UE may first receive a candidate which may become an SR resource via semi-static signaling in the state overridable by L1 signaling and, when dynamic TDD configuration or scheduling overrides the resource of the state onto the UL state, the UE may determine that the resource is available as SR resource.

At this time, where overridable state does not override DL or UL, it is not used, only PDCCH monitoring is performed, or it may be used assumed as DL state.

Specifically, the UL by semi-static DL/UL configuration may assume that the SR resource has unconditionally been validated.

Further, the cases of being validatable are as follows.

Where group common PDCCH is configured, SFI indicates UL

Where PUSCH is scheduled by dynamic scheduling

Where PUCCH is transmitted by dynamic/semi-static configuration

Where CSI trigger is validated, PUCCH transmission occurs

In this case, the SR is transmitted in the PUCCH resource generated by the periodic CSI trigger, and the CSI may be dropped.

Where SR transmission is skipped, the UE may notify the higher layer whether the SR occasion is skipped.

(Method 3)

Method 3 uses methods 1 and 2 together or in combination.

For example, one SR configuration may override the SR resource allocation that applies as semi-static UL, and the SR resource allocation which may not be used before overriding UL may be included simultaneously.

Resultantly, the following techniques may be considered.

The SR transmission resource recognized as UL by semi-static DL/UL configuration is assumed to be valid.

Considers the option that the SR transmission resource recognized as UL by dynamic DL/UL configuration is assumed to be valid.

Where recognized as UL resource by scheduling, it is assumed to be valid as SR transmission resource.

Where skipped as SR occasion is invalid according to above

In this case, dropping SR transmission or transmitting the SR in the next, first available UL resource Here, the next, first available UL resource may count only SR occasions, or although not an SR occasion, the next, first available UL resource may use the PUCCH resource.

At this time, the position of other available PUCCH resource may be limited to the PUCCH resource determined via semi-static signaling between the base station and the UE.

Further, the position of the PUCCH may be limited as where it is shown as UL in semi-static TDD configuration.

If SR transmission is skipped, the UE may notify the higher layer whether the SR occasion is skipped.

Method 1 ensures SR resource but has difficulty in using a short periodicity of SR.

Method 2, although receiving an SR resource allocation, may not use it.

In particular, where method 1-1 is used, although the periodicity of the SR resource configuration is set to be short, it may, in practice, have a long periodicity of SR according to the semi-static UL resource.

Thus, it may be considered using method 3 to allocate a long periodicity of SR resource via method 1-2 and allocate a short periodicity of SR via method 2.

Using method 1-1, the length of available semi-static resource may differ from that of SR resource configuration.

As an example, where there are only symbol-unit or mini-slot-unit semi-static UL resources, the SR which uses long slot-unit PUCCHs may not be put to use.

At this time, if the SR resource configuration uses a long PUCCH, a problem may arise.

Thus, the following method may be considered which counts semi-static UL resources in method 1-1.

(Option 1)

Option 1 may be counting only semi-static UL resources whose length is identical to or larger than the length of the PUCCH for the SR indicated by the SR resource allocation.

(Option 2)

Option 2 may determine the PUCCH resource according to the length of consecutive semi-static resources available at the time the set periodicity ends without indicating the length of the PUCCH for SR in the SR resource allocation.

As an example, where the SR configuration has a periodicity of K in symbol units, it may be used after the semi-static UL resources corresponding to K symbols and, according to the length of the consecutive first semi-static UL resource, the UE may determine the length of the PUCCH for SR and transmit the same.

Specifically, the SR resource may occur while overlapping HARQ-ACK transmission.

In this case, in the PUCCH transmission, the resource may be varied dynamically according to dynamic TDD, and the dynamically varying resource may include, e.g., length or format.

For the method of transmitting SR according dynamic PUCCH resource, the following may be considered.

When the periodicity of SR is a multiple of slot

Where PUCCH is also transmitted in the slot(s) (e.g., HARQ-ACK), (1) PUCCH format, (2) duration, and (3) starting/ending symbol are determined according to the configuration of PUCCH resource.

Frequency or code domain resource for SR transmission is selected according to the SR resource.

When the periodicity of SR is a multiple of symbol

With respect to the starting symbol and end symbol (OFDMS1, OFDMS2) of the SR occasion, if the starting symbol of PUCCH is identical to or larger than OFDM S1 and is identical to or smaller than OFDM S2, the UE determines PUCCH resource in the same operation as the slot. In other words, information related to PUCCH format/time-domain may follow the PUCCH dynamic configuration, and code/frequency information may follow SR resource configuration.

Such case encompasses the case where PUCCH occurs including an SR occasion or the case where PUCCH is not triggered.

Where PUCCH is not triggered, PUCCH format/time-domain information is determined according to SR configuration.

Where PUCCH is larger than SR occasion, it may be assumed to be transmitted at the next SR occasion.

Where SR is transmitted overlapping HARQ-ACK, if the PUCCH used for the transmission is 2 bits or less, SR and HARQ-ACK may be transmitted while overlapping each other only when being completely identical, in PUCCH starting and duration used for transmission, to the resource previously designated semi-statically to the SR in PUCCH starting and duration.

Otherwise, it is regarded as invalid configuration, and SR or HARQ may be dropped.

1-1th Implementation

The 1-1th implementation regards SR transmission that uses available PUCCHs for other UCIs.

In this method, when the allocated SR resource is determined to be unavailable as described in the first implementation, it may be considered to use the PUCCH resource for other UCI transmission present in the available UL resource although it is not at an SR occasion.

Or, when it is unclear whether the SR resource is available or unavailable, it may be considered to use other PUCCH resource available to reduce the latency time or in preparation for the case where the SR resource is rendered unavailable by dynamic SFI or scheduling.

If there are multiple SR resource configurations, the SR transmitted in another PUCCH for other UCI may be mapped to the first SR configuration or be mapped to an SR configuration determined by the higher layer signaling of the base station, or the SR occasion of the SR configuration may be mapped to the corresponding configuration or the configuration closest to another PUCCH.

The following method may be used in using other PUCCH resource.

1-1-1th Implementation

Upon selecting another PUCCH for other UCI in which the UE is to transmit SR, the PUCCH closest to the time that the SR is triggered may be selected.

In this case, the base station may need to perform blind decoding on whether only UCI has been transmitted or other UCI requested and the SR for all PUCCHs allocated to the UE have been transmitted.

1-1-2th Implementation

Upon selecting another PUCCH for other UCI in which the UE is to transmit SR, selection may be made based on the length of the PUCCH for the other UCI.

For example, only the PUCCH resource identical in length to or longer than the PUCCH for SR previously allocated may be used.

Specifically, when receiving an allocation of K symbol short PUCCH for SR, the UE may transmit the SR using a long PUCCH or K' symbol short PUCCH (K'>K).

1-1-3th Implementation

Upon selecting another PUCCH for other UCI in which the UE is to transmit SR, selection may be made based on the size of UCI transmitted in the PUCCH for the other UCI.

For example, a PUCCH where a UCI smaller than 2 bits is transmitted, a PUCCH where a UCI larger than 2 bits is transmitted, or a PUCCH where a UCI larger than (any) K bits is transmitted may be selected.

1-1-4th Implementation

To reduce blind decoding in the base station upon selecting another PUCCH for other UCI for the UE to transmit the SR, a PUCCH for other UCI closest to the SR occasion previously allocated or present within a certain time length K may be used.

In particular, to reduce ambiguity of dynamic SFI or scheduling, only the PUCCH for other UCI set as semi-static UL resource may be used.

When the SR occasion the base station has allocated to the UE is allocated as flexible or DL resource, the base station may blind-decode the SR in other PUCCH allocated to the UE.

1-1-5th Implementation

To reduce blind decoding in the base station upon selecting another PUCCH for other UCI for the UE to transmit the SR, or to allocate more SR occasions, whether to include the SR may be set upon allocating the PUCCH for the other UCI.

Second Implementation

The second implementation regards determining a UL resource (e.g., an SR resource) which is configured with a periodicity that is smaller than a duration of a slot.

In new RAT, the UL resource (e.g., an SR resource) may not only be a slot-level resource but may also be a mini-slot/symbol-level resource.

Thus, the periodicity and/or offset of the periodic UL resource (e.g., SR periodicity and SR offset of an SR resource) may also be those of the mini-slot/symbol-level as well as those of slot-level.

However, in scenarios where the periodicity and/or offset are based on a mini-slot/symbol-level, it may generally not be preferable for the PUCCH/PUSCH used for UL transmission to encroach the slot boundary.

Thus, a technique according to the second implementation may help avoid the UL resource from encroaching upon the slot boundary in scenarios where mini-slot/symbol level periodicity and/or offset are used, upon periodic UL resource configuration (e.g., periodic SR resource configuration).

2-1th Implementation

In the 2-1th implementation, upon configuring the periodic UL resource (e.g., a periodic SR resource) with a periodicity and/or offset that is smaller than a duration of the configured slot, the periodic UL resource configuration may indicate the UL resource with a similar interval to the target periodicity in one slot, for example, multiple PUCCHs/PUSCHs may be explicitly indicated one-by-one, and such a resource pattern may be repeated every slot.

As an example, where a 4 symbol-long mini-slot has a 7 symbol-long periodicity, then two 4 symbol PUCCH resources, one having a 2nd symbol as the starting symbol and the other having a 9th symbol as the starting symbol, may be allocated to the UE in one configuration.

By such techniques, even in scenarios where the interval between the PUCCHs differs from the periodicity that was explicitly given (e.g., the periodicity of the SR that was explicitly signaled), the base station may allocate the SR resource fitting the slot format to the UE in a more flexible manner.

When using such techniques, an SR configuration index for which the periodicity and/or offset smaller than the duration of a slot may indicate the time-domain pattern of PUCCH resource.

As an example, where a 7 symbol-long mini-slot is configured with a 7 symbol-long periodicity, then the parameters for periodicity and offset may implicitly indicate the time-domain resource allocation in which two 7 symbol mini-slots are consecutively present in one slot.

In some scenarios, the SR configuration index may indicate a pre-defined pattern of symbols where the PUCCH is to be allocated.

Figure 7:
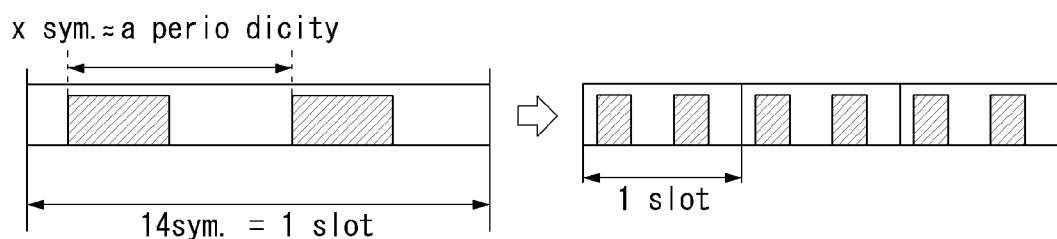
FIG. 7 illustrates an example of an implementation according to the present disclosure.

FIG. 7 illustrates an example of this aforementioned 2-1th implementation according to the present disclosure.

2-2th Implementation

In the 2-2th implementation, a periodic UL resource (e.g., a periodic SR resource) may be configured with periodicity and/or offset smaller than a duration of the configured slot. The periodicity and/or offset may be received as part of SR resource configuration, for example, from the base station through higher-layer signaling. In such scenarios, in a single slot, the periodic UL resource configuration explicitly indicates only one PUCCH/PUSCH in that slot.

A resource pattern may be created through repetitions at a target periodicity interval that are configured so as to prevent the UL resource from extending beyond the slot boundary, and such a resource pattern may be repeated every slot.

In using the 2-2th implementation, in some scenarios the PUCCH resource indicated by the PUCCH resource configuration (e.g., the SR resource configuration) may be defined only within the periodicity length.

As an example, where a 7 symbol periodicity is used, the ending symbol (starting symbol+transmission duration) of the defined PUCCH resource may be the nth symbol (n<=7), such that the PUCCH resource is confined within a single 7 symbol periodicity length.

In this example, because the PUCCH resource is confined within the configured periodicity, the entirety of each configured PUCCH resource may be fully used when repeated periodically.

FIG. 8 illustrates an example of this aforementioned 2-2th implementation according to the present disclosure. In addition, some specific examples of this 2-2th implementation are described below.

2-2-1th Implementation

In one example of a 2-2-1th implementation, if the periodicity and/or offset is smaller than a slot duration as described above, then the SR resource may be determined based on the starting symbol of the PUCCH. For example, the starting symbol of the PUCCH (which was previously provided) may be used along with the symbol-level offset of the UL resource configuration.

When the symbol-level offset is a set of multiple values or may be converted into multiple values as per a certain rule, then a different symbol-level offset, i.e., for the starting symbols of other PUCCHs, may be applied at each repeated slot.

In the 2-2-1th implementation, since the periodicity and/or offset can be configured at a symbol level in NR, offset 0 is given, and pre-existing offset information may be used to reduce signaling overhead. As such, in these scenarios, the periodicity may be explicitly signaled from the base station, while the offset may be determined by the UE implicitly based on the periodicity information.

The DMRS used in the UL resource is necessary for the base station to receive transmission from the UE.

In the UL resource, the position of DMRS transmission may be determined based on the starting point of the UL resource transmitted or based on the starting point of the slot.

As an example, in the case of new RAT PUSCH, the position of DMRS may be determined based on the starting point of the slot where the resource is positioned in PUSCH mapping type and, in PUSCH mapping type B, based on the starting symbol of the allocated resource.

Where the position of DMRS uses the periodic UL resource determined based on the starting point of the slot, there may be ambiguity in determining the DMRS position of the repeated resource smaller in periodicity than one slot (e.g., 2 sym or 7 sym). At this time, the following method may be considered.

(Method 1)

The UE may assume that the periodicity of the periodic UL resource where the DMRS position is determined based on slot is always larger than one slot.

In other words, the UE may assume that the periodicity is one slot if such configuration is not expected or is received.

(Method 2)

Where the periodicity of periodic UL resource where the DMRS position is determined based on slot is smaller than one slot, the UE may determine the DMRS position based on the starting point of slot for the first resource in the slot and, for later repeated resources, based on the starting symbol position of the resource.

(Method 3)

Where the periodicity of periodic UL resource where the DMRS position is determined based on slot is smaller than one slot, the UE may determine the DMRS position based on the starting point of slot for the first resource in the slot and, for later repeated resources, may use the DMRS position identical to the first resource for the later resources using a relative position between the starting symbol of the first resource and the DMRS of the first resource.

Third Implementation

The third implementation regards handling period/timing/offset for dynamic TDD.

To configure SR resources which repeatedly occur or other PUCCH, PUSCH, and PDSCH resources, the periodicity and offset of resource occurrences may be set.

Such time information may be determined for various purposes and bases.

As an example, the time information may be configured to secure time for UE processing, to meet a certain latency target, or simply to give a predetermined DL/UL resource interval.

Given that in new RAT DL/UL configuration may be varied at every moment, analysis of the time information may also be varied depending on purposes and bases.

As an example, where the time information is intended for giving a predetermined size of UL resource or an interval between UL resources, UL, UL-centric, and/or convertible-to-UL slots/mini-slots/symbol resources only may be counted. If the time information is an offset, interval, or period for securing a processing time for the UE, the slots/mini-slots/symbols may be counted regardless of the DL/UL configuration. Such time information may be divided into two as follows.

1. Timing Information

This may be time information indicating the starting or ending timing of a certain operation such as an offset from a certain reference point to the allocated resource or an offset from DL or UL transmission to feedback transmission.

2. Duration Information

This may be time information indicating time duration during which a certain operation is performed, such as transmission duration or repetition.

As an example, the duration information may include, e.g., the slot aggregation of time-domain resource allocation.

At this time, timing information and duration information may apply in the following manner.

3-1-a-th Implementation

In the 3-1-a-th implementation, upon counting UL or DL resources for the timing information, only semi-static UL or DL resources may be counted.

In using the timing information, only unambiguous, valid UL or DL resources may be considered.

As an example, although the offset of SR resource configuration is configured to have the same periodicity but different starting times, unless the resources in which SR is actually transmittable are counted, the SR occasion of the SR configuration with the same periodicity but a different offset may occur at the same timing.

To address this issue, timing information may be applied, with only semi-static DL/UL resources considered for timing information of DL/UL resource configuration.

3-1-b-th Implementation

In the 3-1-b-th implementation, upon counting UL or DL resources or times for the timing information, only semi-static non-DL or non-UL resources may be counted.

More specifically, the non-UL resource may mean a semi-static DL resource, a dynamically indicated DL resource, or flexible resource.

The non-DL resource may mean a semi-static UL resource, a dynamically indicated UL resource, or flexible resource.

In using the timing information, potential valid UL or DL resources may be considered.

In such a case, not only semi-static DL/UL resources and dynamically indicated DL/UL resources, but also flexible resources that may be converted into UL or DL resources by dynamic SFI or dynamic scheduling may also be counted.

3-1-c-th Implementation

In the 3-1-c-th implementation, upon counting UL or DL resources or times for the timing information, slots/mini-slots/symbols may be counted without considering the slot format.

In using the timing information, the absolute time length may be material regardless of the UL/DL direction of resource.

As an example, if the timing information is for the UE's processing time, a predetermined time or more needs to be secured regardless of the slot format.

3-2-a-th Implementation

Upon counting UL or DL resources for the duration information, only semi-static UL or DL resources may be counted.

In using the duration information, only unambiguous, valid UL or DL resources may be considered. As an example, only resources actually transmittable may be counted to ensure a predetermined number of, or more, repeated transmissions.

3-2-b-th Implementation

Upon counting UL or DL resources or times for the duration information, only semi-static non-DL or non-UL resources may be counted. More specifically, the non-UL resource may include a semi-static DL resource, dynamically indicated DL resource, or flexible resource, and the non-DL resource may mean a semi-static UL resource, dynamically indicated UL resource, or flexible resource.

In using the duration information, potential valid UD or DL resources may need to be considered. As an example, a sufficient number of repetitions may be configured, and slots/mini-slots/symbols impossible to transmit may be dropped, or only when possible, repetition or TTI bundling may be carried out. In such a case, not only semi-static DL/UL resources and dynamically indicated DL/UL resources, but also flexible resources that may be converted into UL or DL resources by dynamic SFI or dynamic scheduling may also be counted.

3-2-c-th Implementation

In the 3-2-c-th implementation, upon counting UL or DL resources or times for the duration information, slots/mini-slots/symbols may be counted without considering the slot format.

In using the duration information, the absolute time length may be material regardless of the UL/DL direction of resource.

As an example, if the timing information is for the UE's processing time, a predetermined time or more needs to be secured regardless of the slot format.

3-2-d-th Implementation

Upon counting UL or DL resources or times for the duration information, if a specific resource or first or last UL/DL resource is invalid in the duration, all the resources in the duration may be determined to be invalid or, although valid, may not be used.

In other words, the resource in a specific position may be required to be valid to use a valid resource in the duration information.

This method may apply only when the UE skips transmission of invalid resources.

Where the UE is required to always maintain a specific parameter mapped to the resource upon starting transmission, it may be necessary to secure the parameter-mapped resource all the time.

In particular, where the UE uses multiple resources for one transmission for repeated transmission purposes, if the specific parameter-mapped resource among the resources is not secured, the base station may not receive transmission from the UE although other resource is used.

As an example, the resource may mean, to the base station, the start of transmission by the UE or may be a resource in which systematic bits are transmitted, or a unique resource.

Thus, where the UE uses multiple resources, e.g., repeated transmissions, for one transmission, whether to start transmission may be considered given the validity of the specific resource.

More specifically, the resource may be one or more determine as per a certain rule among the resources used for transmission or the starting or ending point.

In using the method of the third implementation, different methods may be used depending on the method of allocation of the timing information or duration information.

More specifically, a different method may be used depending on whether the information is indicated via dynamic L1 signaling or via higher layer signaling.

The direction of resources to be counted may be predetermined by the resource configuration including time information or by the parameter included in the configuration.

If slot aggregation or repetition is applied in applying the above methods, different methods may be applied to resources explicitly allocated and resources implicitly allocated.

As an example, where PUSCH resource A0 transferred via DCI and PUSCH resources A1, A2, and A3 present in three consecutive slots by slot aggregation factor K=4 are additionally used, different methods may be used for A0 and for [A1, A2, A3].

Specifically, A0 may relate to when the 3-2-a-th or 3-2-b-th implementation is used, and the other resources may relate to when the 3-2-c-th implementation is used.

The above methods, unless mutually exclusive, may be used in combination.

Specifically, in the above example, the 3-2-d-th implementation may be further applied.

In using the method of the third implementation, upon performing PUSCH transmission, in particular, grant-free PUSCH transmission, a different method may be applied depending on a preset parameter, in particular redundancy version (RV) sequence.

As an example, in counting the repetitions, the 3-2-a-th, 3-2-b-th, or 3-2-c-th implementation may be used if RV sequence [0000] is used, and the 3-2-dth implementation may be used if RV sequence [0231] is used.

Fourth Implementation

The fourth implementation regards PUCCH/PUSCH repetition/aggregation.

For coverage of PUCCH/PUSCH transmission, it may be considered to simultaneously use consecutive resources.

Since the resources may be allocated to the UE via dynamic or semi-static signaling, use of the consecutive resources requires consideration of dynamic TDD and resource construction.

In particular, slot-level PUCCH scheduling may simply use consecutive slots, but non-slot scheduling may consider repetition of time-domain resource allocations (TD RA), which are small in size, for the purpose of, e.g., latency.

For repetition of slot/non-slot scheduling, the following methods may be taken into account.

Method 4-1-1

Method 4-1-1 may repeat TD RA configured in slot level regardless of slot/non-slot.

Since TD RA is typically defined as what symbol is used in one slot regardless of slot/non-slot scheduling, this method may be used to apply the same method to slot/non-slot.

Method 4-1-2

Method 4-1-2, in the case of non-slot scheduling, may be similar to that of the 2-2th implementation.

Specifically, the same length of periodicity as PUCCH duration may be applied, and repetition is performed as many times as the number of repetitions determined by the method of the 2-2th implementation.

As the 2-2th implementation is used which applies the same length of periodicity as the PUCCH duration, the consecutive symbols subsequent to the given TD RA may be used for PUCCH transmission.

Method 4-1-2-1

In method 4-1-2-1, where the repeated TD RA overlaps the slot boundary upon applying the 2-2th implementation, the TD RA alone is not used.

Method 4-1-2-2

In method 4-1-2-1, where the repeated TD RA overlaps the slot boundary upon applying the 2-2th implementation, not only the TD RA but also its subsequent TD RAs are not used.

In other words, the PUCCH resources simultaneously used may be defined only in the slot.

Method 4-1-2-3

In method 4-1-2-3, where the repeated TD RA overlaps the slot boundary upon applying the 2-2th implementation, the TDRA is not used, and a TDRA given at the early stage of the next slot may be applied again and repeated.

By allowing for use of similar resources in slot-level, this may be useful in facilitating the application of multiplexing and UE operation used for slot-level scheduling.

Where the TDRA is applied again in the next slot, this may be creating a transmission occasion regardless of semi-static DL/UL configuration.

Method 4-1-2-4

In method 4-1-2-4, where the repeated TD RA overlaps the slot boundary upon applying the 2-2th implementation, the TDRA is not used, and duration according to the TD RA from the first UL symbol of the next slot (flexible and fixed UL symbol by semi-static DL/UL configuration) is applied, thereby creating an occasion.

Or, it may be considered to configure transmission occasions only for resources determined as UL semi-statically or via dynamic SFI.

Or, they may sequentially be applied from the first OFDM symbol of the next slot.

A difference between this method and short TTI transmission of LTE is that if going beyond the boundary, the repeated transmission is performed at the point corresponding to the position of the repeated transmission but rather than immediately attached in the next slot. In other words, repeated transmission is performed in specific symbol units.

Method 4-1-3

Method 4-1-3, in the case of non-slot scheduling, may be similar to that of the 2-2th implementation, but may apply the periodicity determined according to the transmission duration of non-slot scheduling.

When one of the set [1, 2, 4, 8] is used as reception count, specific-length non-slots may be limited in use.

As an example, when 4 symbol non-slot scheduling is performed, if four repetitions are continuously carried out, it inevitably ends up invading the slot boundary.

Thus, it may be considered to allow the predetermined length to be smaller than the slot for maintaining the gain of non-slot repetition although repetition is performed in a predetermined length to prevent the non-slot scheduling from invading the slot boundary.

Specifically, a predetermined length of periodicity per PUCCH transmission duration may be applied, and repetition is performed as many times as the number of repetitions determined by the method of the 2-2th implementation.

The predetermined length of periodicity may be 2 or 7 symbols in the case of normal CP or 2, 3, 4, or 6 symbols in the case of extended CP not to invade the slot boundary.

Method 4-1-3-1

As another example, a method available is to 2 symbol repeat for 1, 2 symbol-length non-slot scheduling and to 7 symbol repeat for 4, 7 symbol-length non-slot.

At this time, each non-slot scheduling is defined only in [(2n−1)th symbol, (2n)th symbol] (1<n<=7, for non-slot of 1 or 2 symbol) or [1st symbol, 7th sym.], [8th symbol, 14th symbol] duration (for non-slot of 4 or 7 symbol).

Method 4-1-4

Method 4-1-4 uses methods 4-1 and 4-2 together or in combination.

Specifically, when slot aggregation factor K is given, method 4-1 may be used as many times as K1, and method 4-2 may be used as many times as K2, with K1 and K2 meeting K=K1*K2.

At this time, non-slot scheduling repeated K2 times may not invade the slot boundary.

K1 and K2 may be pre-determined according to K and the transmission duration of non-slot scheduling.

Where it is hard to differentiate between slot-level scheduling and non-slot level scheduling in applying the above methods, e.g., where there is no distinction between non-slot and slot when the UE is scheduled, the above different methods may be applied only using the transmission duration of the PUCCH or PUSCH simply given.

As an example, a method applicable to non-slot scheduling may be used for PUSCH/PUCCH allocation of 2, 4, or 7 symbols, and a method applicable to slot scheduling may be used for others.

Or, a method applicable to non-slot scheduling may be used for PUSCH/PUCCH allocation of K symbols or less, and a method applicable to slot scheduling may be used for others.

At this time, K may be a pre-defined value. Or, the method of the sixth Implementation described below may be applied to distinguish between slot and non-slot scheduling.

In using methods 4-1-2-3 and 4-1-2-4, it may be critical to determine the first valid or available symbol in the next slot.

In particular, upon selecting the UL or flexible symbol for uplink transmission as in the above example, it may be of significance whether the corresponding symbol is available in a desired direction via other elements, rather than determination simply based on the slot format.

Given this, the following methods may be considered in determining the first valid or available symbol in the next slot.

Method 4-2-1

Method 4-2-1 is to simply select the first flexible or UL resource.

Method 4-2-2 is to select the first flexible or UL symbol except for the first k flexible symbols if the resource is the flexible symbol.

This may consider the DL/UL switching gap considering the TA of the UE.

At this time, k may be a value determined by higher layer signaling or L1 signaling from the base station, a value derived from the TA the UE uses, a value elicited based on the MAX TA available, or a value from a reference TA allocated by higher layer signaling or L1 signaling from the base station.

Method 4-2-3

Method 4-2-3 reuses the time-domain resource allocation (TDRA) included in the information indicating transmission, e.g., information such as start symbol or symbol length, in the next slot.

The UE may again use the start symbol or duration as it is.

In other words, the first valid resource may be determined by method 4-1-2-4.

Method 4-2-4

Method 4-2-4 may be to use the flexible or UL symbol bundle first shown from a certain reference point.

As an example, the flexible or UL symbol bundle first shown from the start symbol shown in the TDRA may be used.

By this, the baseband signal allows the UE to use a specific time as a reference point in selecting the UL resource, preventing the UE from failure in transmission due to, e.g., DL/UL switching gap.

The reference point may be obtained from the TDRA or by higher layer signaling or L1 signaling from the UE.

As an example, the reference point may be implicitly obtained by the UE via the slot format or may be obtained based on the transmission direction, e.g., configured grant, CSI report/measurement, or configuration for other measurement.

This method may apply differently depending on contexts. By the following method, different methods 4-2 may apply.

Method 4-3-1

Method 4-3-1 may be to use method 4-2-1 when the UE uses resources with only one direction.

As an example, where the UE uses a paired spectrum, and where there is only UL/DL or flexible as the slot format of UL/DL spectrum, method 4-2-1 may be used.

Method 4-3-2

Method 4-3-2 may be to use one of method 4-2-2, method 4-2-3, and method 4-2-4 when the UE uses resources (e.g., dynamic TDD) with a flexible direction according to times.

Method 4-3-3

Method 4-3-3 may be to use method 4-2-1 if the UE may expect the direction of flexible resource although using the flexible resource which may be DL or UL according to the time and, otherwise, method 4-2-2, method 4-2-3, or method 4-2-4.

As an example, this method may be useful where the slot where the UE is to select the first valid resource lacks an opposite direction resource (DL in the case of UL) and the last resource/symbol of the prior slot is the same direction resource or same direction resource or flexible.

Or, this method may be used when the same direction measurement is configured in the slot where the UE is to select the first valid resource.

Method 4-3-4

Method 4-3-4 may be to use method 4-2-4 based on the time when the direction may be expected if the UE may expect the direction of flexible resource although using the flexible resource which may be DL or UL according to the time and, otherwise, method 4-2-1, method 4-2-2, or method 4-2-3.

As an example, where the same direction measurement is configured in the flexible resource of the slot where the UE is to select the first valid resource, the corresponding resource may be used as reference point, and this method may be useful.

In new RAT, an SR is typically transmitted in PUCCH format 0 or PUCCH format 1.

Where a PUCCH format (e.g., PUCCH format 1) supporting slot aggregation/repetition is allocated to the UE, the UE may use the corresponding resource for SR transmission.

In particular, where an SR opportunity/trigger is present in an aggregated K PUCCH, the following may be considered.

Here, K is the number of PUCCHs in the aggregated PUCCH.

Where the SR opportunity/trigger is the nth slot/symbol/mini-slot of the aggregated K PUCCH, if N≥k, the SR may be transmitted in PUCCH transmission.

At this time, k may be 1 or a fraction of K (e.g., floor[K/N]).

Where an SR opportunity/trigger occurs during the aggregated K PUCCH, upon SR transmission, the SR may be transmitted together only in transmission of the PUCCH where the SR opportunity/trigger occurs of the aggregated K PUCCH.

the SR may be transmitted in transmission of the PUCCH where the SR opportunity/trigger occurs and its subsequent PUCCH of the aggregated K PUCCH.

The repetition of PUSCH transmission to which slot aggregation or repetition is applied using the techniques described in the third implementation may be counted.

At this time, the uplink resource to be used for repetition or slot aggregation may also be obtained by the techniques described above or the second implementation.

The so-obtained resource may be rendered invalid by other uplink transmission or dynamic TDD signaling.

In this case, if the corresponding resource is UL, the following may apply.

Condition 1-1: Where a semi-static SFI is configured and the semi-static SFI is a symbol configured as DL Condition 1-2: Where a dynamic SFI is configured, the semi-static SFI is configured, and when the semi-static SFI is configured as unknown or is not configured, the dynamic SFI is a symbol indicated as DL Condition 2-1: Where a dynamic SFI is not configured, the semi-static SFI is not configured or the semi-static SFI is configured and there is no UL grant for the symbol in which the semi-static SFI is configured as unknown Condition 2-2: Where a dynamic SFI is configured, the semi-static SFI is not configured or the semi-static SFI is configured and there is no UL grant for the symbol in which the semi-static SFI is configured as unknown and the dynamic SFI is configured as unknown Condition 3: Where the UE is incapable of simultaneous transmission of PUSCH and PUCCH or has no configuration, where PUCCH transmission or other PUSCH transmission is prioritized over given PUSCH in the same cell Condition 3-1: Where prioritized PUSCH/PUCCH transmission is made by semi-static configuration Condition 3-2: Where prioritized PUSCH/PUCCH transmission is made by dynamic signaling Condition 1 may be said to be the case where the resource is a DL resource, condition 2 may be said to be the case where the resource is an unknown resource but there is no separate UL indication, and condition 3 may be said to be the case where it is deprioritized by PUCCH.

Condition 2 may not occur in PUSCH transmission by dynamic grant.

According to the above conditions, if the PUSCH resource allocated to the UE may not be used, the UE may consider such operation as (1) drop transmission or (2) skip or postpone transmission (drop transmission occasion).

Here, drop or skip means performing neither transmission nor transmission for compensation in other resource.

Specifically, drop means abandoning transmission. Where the UE drops PUSCH transmission, transmission in the resource may be regarded as failed.

In other words, upon dropping, repetition may be counted. Skip or postpone means, when the uplink resource is unavailable for the above reasons, abandoning the transmission occasion (TO) and performing transmission for compensation for de-prioritization in other uplink resource.

Thus, in the abandoned TO, repetition may be not counted.

Given this, the UE may consider the following operations if PUSCH transmission using several TOs for repetition is impossible to use.

Behavior 1 (drop resource): drops the TO at the time of transmission being impossible to use, and abandons transmission.

In this case, the abandoned transmission may be assumed to have been performed but failed.

Specifically, although transmission is not performed, repetition may be counted.

In other words, where the UE performs transmission at the corresponding time but actually performs transmission in the next remaining TO, transmission parameter (e.g., RV or order of repetition) may be selected under the assumption that transmission has been performed in the prior dropped TO.

Behavior 2 (skip resource): drops the TO at the time of transmission being impossible to use, and performs transmission in the next TO.

Specifically, transmission may be performed using the transmission parameter (e.g., RV or order of repetition), which was intended to be used in the corresponding TO, in the next remaining TO rather than counting repetition.

Behavior 3 (postpone resource): postpones the TO at the time of transmission being impossible to use to another time, and performs transmission in the postponed TO.

Specifically, K TOs may be determined considering, e.g., the transmission direction of resource (e.g., UL/DL configuration or slot format indicator) in configuring K TOs for K repetitions.

In this case, the position and number of TOs within a predetermined time may be varied depending on the transmission direction configuration of resource.

Behavior 2 and behavior 3 differ in configuring TOs. Where the UE uses behavior 2 in the resource rendered to be impossible to use, transmission is postponed to the next TO but the total number of TOs does not vary.

In other words, where the second TO to be used for the second repetition among the four repetitions in total is invalid for UL transmission, the second and third repetitions are transmitted in the third and fourth TOs, and the fourth repetition is not transmitted with no other TOs for new positions defined.

In contrast, where the UE uses behavior 3 in the resource rendered impossible to use, the UE may prevent the case where the TO is rendered invalid considering the validity of resource in configuring the TO from the beginning or may avoid the case where the TO is rendered invalid by postponing all of the second, third, and fourth TOs to available/valid resource if the second TO is invalid for UL transmission as above.

Resultantly, the UE may configure the position of TO considering the validity of resource and avoid repetition transmission in the invalid resource, thereby securing more repetitions than other behaviors.

However, if such a method is used, the configuration of TO may be dynamically varied depending on the transmission direction configuration of resource as described above.

The TO determined by the UE and the TO determined by the base station may differ from each other depending on the reliability of signaling determining the transmission direction.

Further, it may be impossible to secure a sufficient number of TOs within a predetermined time depending on the configuration of transmission direction and the method of determining TO.

As an example, it may be impossible to secure as many TOs as the repetition count K during the periodicity of semi-persistent scheduling (SPS)/grant-free configuration.

FIG. 9 illustrates an example of an operation of a UE for repetition/aggregation according to implementations of the present disclosure.

PUSCH transmission by dynamic grant may be performed via higher layer signaling as in conditions 1-1 and 3-1 and information mutually identified to have been transferred between the UE and the base station may be skipped or postponed.

However, in the case of PUSCH transmission by configured grant, in particular, where the UEs performing transmission via configured grant use the same resource, if the UEs differently skip or postpone via UE-specific transmission direction configuration, effective resource allocation may be difficult.

Where TO or transmission is postponed in the resource rendered impossible to use via dynamic signaling as in conditions 1-2 and 2-2, the UE and the base station may perform transmission and reception with different TO, TX predictions.

Thus, the following may be considered for the PUSCH using configured grant.

Method 1

Method 1 may be to drop initial transmission and repetition when the corresponding resource is canceled or rendered invalid for some reasons for the PUSCH using configured grant.

At this time, TO may be dropped unconditionally. In other words, behavior 1 may be operated unconditionally.

Method 2

Method 2 may be to skip or postpone initial transmission and repetition and drop repetition when the corresponding resource is canceled or rendered invalid for some reasons for the PUSCH using configured grant.

In other words, behavior 2 or 3 may be performed for initial transmission, and behavior 1 may be operated for the remaining repetition transmission.

Method 3

Method 3 may be not to postpone, at least, TO, for the PUSCH using configured grant.

In other words, this may be to use only behavior 1 or 2.

Specifically, upon using configured grant, the configuration of TO may be irrelevant to the validity of resource and, in the case of transmission, behavior 1 or behavior 2 may be used depending on the reason why the uplink resource is impossible to use.

The reason why uplink resource is impossible to use may be condition 1-1, 1-2, 2-1, 2-2, 3-1, or 3-2.

As a specific example, if it is impossible to use under condition 1-1, 2-1, or 3-1, behavior 2 may be operated and, if it is impossible to use under condition 1-2, 2-2, or 3-2, behavior 1 may be operated.

The major reason why the UE performs slot aggregation or repetition is typically to secure reliability of transmission and coverage in a poor channel environment.

If dropping the slot aggregation or repetition-applied PUSCH, the UE may fail to achieve sufficient slot aggregation or repetition as intended by the base station.

At this time, the above issues may be addressed by the following methods.

Method 1

Method 1 may be that the base station simply sets a sufficient size of repetition count previously considering drop.

Method 2

Method 2 may allow some PUSCH resources to be valid in a semi-static method by configured grant.

In this scenario, for example, the following methods may be used.

Method 2-1

In method 2-1, the UE assumes that a specific position allocated upon grant-free PUSCH configuration, e.g., the first or last resource, is valid all the time, and it may not be considered to allocate other uplink transmission to the corresponding resource.

The specific position may differ per RV sequence of PUSCH configuration.

Method 2-2

In method 2-2, the UE assumes that a specific RV allocated upon grant-free PUSCH configuration, e.g., RV0 and/or RV3, is valid all the time, and it may not be considered to allocate other uplink transmission to the corresponding resource.

The specific RV value may differ per RV sequence of PUSCH configuration.

Method 3

In method 3, when K resources in total are allocated for slot aggregation or repetition, and K' or more resources among the K resources are invalid (K'<K), transmission in all of the K resources may be dropped or postponed regardless of the validity of other resources.

Where grant-free PUSCH is dropped due to collision with UCI transmission (e.g., PUSCH with UCI or PUCCH), the following may be considered for handling.

Where repetition=1, grant-free transmission is performed again in the first available next resource.

PUSCH being dropped is indicated to the higher layer.

Where repetition=k>1, PUSCH dropped due to UCI is skipped only when initial transmission has been sent out.

Where initial transmission is skipped, the entire transmission is postponed.

Similar processing to above is performed. The UE attempts retransmission in the first available resource. Or, if transmission is possible at least as long as k/2, the UE attempts transmission, otherwise postpones the entire transmission.

The above scheme may likewise apply to all drop cases, e.g., drop due to UCI or drop due to SFI.

Fifth Implementation

The fifth implementation regards differentiating between slot scheduling and non-slot scheduling.

First, non-slot scheduling refers to scheduling not in slot units but in units smaller than slot units or back-to-back scheduling of consecutive slots.

Slot scheduling and non-slot scheduling need to be distinguished from each other.

As an example, it is required to identify whether the TD RA given for non-slot aggregation is slot scheduling or non-slot scheduling. In such scenarios, for example, the following methods may be considered.

Method 5-1

In method 5-1, where the resource duration of time-domain resource allocation (TD RA) is a specific length (2, 4, or 7 symbols) used in non-slot scheduling or is within a certain specific threshold range, it may be determined to be non-slot scheduling.

Or, where it is smaller than the specific threshold, it may be determined to be non-slot scheduling.

The specific threshold may be predetermined or determined by higher layer signaling or L1 signaling.

Method 5-2

In method 5-2, where TD RA is performed based on a pre-defined table, a specific index or specific index range of the table may be predetermined for non-slot purposes.

Method 5-3

In method 5-3, where TD RA is performed based on a predefined table, one bit may be added to the data field used when indicating the index of the table so that the bit indicates whether it is slot/non-slot scheduling.

As an example, the bit size of the time resource allocation field included in RRC signaling or DCI may be configured as ceil (log 2(the number of rows in table))+1 bit so that the MSB or LSB indicates non-slot scheduling.

Method 5-4

In method 5-4, where there is some periodicity or interval where the resource may be obtained (e.g., periodicity of SPS/grant-free, periodicity of SR configuration, interval between PDCCH occurrences), if the periodicity or interval is smaller in length than X slots/symbols/frames, it may be determined to be non-slot scheduling. X may be 1 or other predetermined value.

Method 5-5

Method 5-5 is a method of differentiating between slot and non-slot scheduling depending on the DM-RS position.

As an example, when different DMRS positions are used depending on two PUSCH mapping types, the UE may determine that one of the two PUSCH mapping types is non-slot and the other is slot scheduling.

Method 5-5

Method 5-5 is a method of defining one column of the table to differentiate between slot/mini-slot scheduling when TD RA is performed based on a predefined table.

Method 5-6

Method 5-6 is a method of defining a combination of a specific starting symbol and transmission duration or a combination of the starting symbol, transmission duration, and resource mapping type as non-slot scheduling.

Method 5-6-1

As an example, a combination determined within the [(2n−1)th symbol, (2n)th symbol] (1<n<=7) for a 1, 2 symbol-long RA, or a combination determined only within the [1st symbol, 7th sym.], [8th symbol, 14th symbol] duration for a 4, 7 symbol-long RA may be defined as non-slot scheduling.

This may be useful when different repetition/aggregation schemes are used between slot/non-slot scheduling.

Method 5-6-2

In method 5-6-2, where the allocated resource duration is K2 symbols or less when the start symbol of given TD RA is within the range from the first symbol to the K1th symbol, it may be determined to be non-slot scheduling.

This method may be useful for repetition of multiple times of non-slot scheduling in the slot.

K1 and K2 each may be determined via higher layer signaling or L1 signaling or to be a predetermined value.

K1 and K2 may depend upon each other.

Specifically, K1 may be determined depending on K2.

Method 5-7

In method 5-7, the remaining representations of the bit (i.e., SLIV) indicating the start symbol or duration in the TDRA may be used.

When one slot consists of 14 symbols, the number of all possible TDRAs is 105.

To represent this, a 7-bit RRC or DCI field is used. Thus, 23 bit representations may remain.

Thus, some TDRAs may be additionally mapped to the 23 bit representations, so that the bit representations indicate mini-slot scheduling.

Or, unless one symbol duration resource allocation is used, 14 bit representations indicating one symbol duration may be additionally mapped to mini-slot scheduling.

Method 5-7-1

In method 5-7-1, the TD RA of mini-slot scheduling mapped to the remaining bit representations may be the resource of 2, 4, or 7 symbol duration.

Specifically, the TDRA included in method 5-6-1 may be first mapped.

Or, the 7 symbol duration resource defined in the first symbol or eighth symbol may be first mapped, and all next possible 4 symbol duration resources may be then mapped, and 2 symbol duration resource may be mapped to the remaining bit representations.

This way may minimize the latency impact in the insufficient number of bits.

Method 5-8

In method 5-8, the resource may be determined depending on the purpose indicated/configured.

As an example, in the case of time-domain resource allocation or resource allocation for configured grant PUSCH or PDSCH, it may be determined to be mini-slot scheduling.

Method 5-8-1

In method 5-8-1, mini-slot scheduling may be indicated using a different TDRA interpretation depending on the objective of the resource being indicated/configured.

As an example, for the configured grant PUSCH or PDSCH, the # of candidates of K_0/K_2 indicating the slot offset are cut in half, and the remaining one bit may be used to indicate non-slot/slot repetition.

Or, where only one DMRS position is used depending on the purpose indicated/configured, the flag indicating the DMRS position may be used to indicate non-slot/slot repetition.

Method 5-8-2

In method 5-8-2, a one-bit field/parameter may be added to signaling or message in which the resource is indicated/configured so that one of the non-slot/slot repetition is determined to be a scheme for use in the resource.

At this time, the message or signaling may be L1 or higher layer signaling.

In the methods, the featuring operations of slot/non-slot may be determined in determining which one of the slot/non-slot scheduling is to be used.

As an example, it may be determined which one of the transmission repetition scheme of non-slot scheduling or transmission repetition scheme of slot scheduling the UE is to use via the option.

In other words, where such featuring operations (e.g., slot-level repetition or non-slot level repetition) are designated or these operations are performed on a certain service or specific traffic, the scope of the disclosure may be applied.

FIG. 10 illustrates an example which shows a difference, in terms of latency, between slot repetition and non-slot repetition according to implementations of the present disclosure.

Or, where the repetition counts for non-slot/slot scheduling are configurable individually, transmission may be repeated on a slot-basis depending on each repetition count and may simultaneously be repeated on a non-slot basis without differentiating between non-slot/slot scheduling.

As shown in FIG. 10, non-slot-based repetition may reduce the latency that occurs in repetition transmission.

In contrast, slot-based repetition enables easier resource allocation than where resource is allocated considering the UE using other slot-based scheduling or where resource allocation is performed considering the slot-format determined in slot units.

Thus, it may be considered to use together slot repetition and non-slot repetition so that the base station may adjust such tradeoff. This is described below in detail.

Method 5-9

In method 5-9, where the base station simultaneously configures K1, which is the repetition count for slot-level repetition, and K2, which is the repetition count for non-slot-level repetition, for the UE by higher layer signaling or L1 signaling, the UE may repeat non-slot repetition K2 times and repetition bundle K1 times.

At this time, the total number of repetitions is K1*K2.

In other words, although the given resource is repeated similar to method 4-4 in the fourth implementation, K1 and K2 may be given individually.

FIGS. 11A through 11D illustrate an example of slot level repetition according to implementations of the present disclosure.

FIGS. 11A through 11D shows some examples of what has been described above.

FIGS. 11A through 11D illustrate an example in which K1=4 and K2=1, FIG. 11B illustrates an example in which K1=2 and K2=2, FIG. 11C illustrates an example in which K1=1 and K2=4, and FIG. 11D illustrates an example in which K1=2 and K2=4.

Depending on K2, non-slot repetition may not be performed within one slot. At this time, the following methods may be considered.

Method 5-9-1

In method 5-9-1, the UE may assume that where the non-slot repetition using the given K2 is not expected to go beyond one slot or, if so, it is invalid, it may be assumed to be RA or configuration.

Method 5-9-2

Where the non-slot repetition using the given K2 goes beyond one slot, the UE may perform repetition using K2 as much as possible in one slot.

Resultantly, repetition may be performed a number of times smaller than K2 as permitted within one slot.

Thus, in such a case, the total number of repetition transmission opportunities may be smaller than K1*K2.

Method 5-9-3

Where the non-slot repetition using the given K2 goes beyond one slot, the repetition using K2 may occupy one or more slots.

In this case, where repetition using K2 needs k slots, repetition using K1 may be repeated every k slots.

The resource of repetition transmitted off the slot boundary in repetition transmission using K2 may be determined by the method of the fourth implementation.

At this time, where the resource is configured periodically, the periodicity set for the UE may be larger than k*K1*K2.

Sixth Implementation

The sixth implementation regards the validity of non-slot/slot scheduling with dynamic TDD.

By the above methods, the base station may allocate the periodic/aperiodic resource of slot/non-slot level to the UE and, if the slot/mini-slot aggregation is used, the allocated resource may be repeatedly used.

In other words, the base station may simultaneously allocate multiple resources to the UE regardless of whether it is periodic/aperiodic.

The UE may determine the transmission direction (DL/UL/unknown) of each symbol via SFI, scheduling, or separate signaling simultaneously in semi-static/dynamic methods.

The term "unknown" may be replaced with the term "flexible" or other terms.

Thus, when multiple resources are allocated to the UE, all or only some of the resources may be rendered available or unavailable depending on the transmission direction.

Generally, the following UL (DL) resources are available to the UE in new RAT.

Where semi-static SFI is configured, symbol in which semi-static SFI is configured as UL (or DL).

Where semi-static SFI is configured and dynamic SFI is configured, symbol in which semi-static SFI is configured as 'unknown,' and dynamic SFI is indicated as UL (or DL).

Where semi-static SFI is configured and dynamic SFI is configured, when there is a UL grant (DL assignment) for the symbol in which semi-static SFI is configured as unknown, and dynamic SFI is configured as unknown.

Where semi-static SFI is not configured and dynamic SFI is configured, symbol in which dynamic SFI is indicated as UL (DL).

When there is a UL grant (DL assignment) for the symbol in which semi-static SFI is not configured or semi-static SFI is configured as unknown.

Thus, the following may be symbols that the UE may not use as UL (or DL).

Condition 1-1:—Where semi-static SFI is configured, symbol in which semi-static SFI is configured as DL (or UL).

Condition 1-2: Where a dynamic SFI is configured, the semi-static SFI is configured, and when the semi-static SFI is configured as unknown or is not configured, the dynamic SFI is a symbol indicated as DL (or UL)

Condition 2-1: Where a dynamic SFI is not configured, the semi-static SFI is not configured or the semi-static SFI is configured and there is no UL grant (DL assignment) for the symbol in which the semi-static SFI is configured as unknown Condition 2-2: Where a dynamic SFI is configured, the semi-static SFI is not configured or the semi-static SFI is configured and there is no UL grant (DL assignment) for the symbol in which the semi-static SFI is configured as unknown and the dynamic SFI is configured as unknown.

Condition 1 relates to the case where the symbol is configured as DL (UL) in the opposite direction, and condition 2 relates to the case where there is no UL grant (or DL assignment) when the symbol is unknown.

Where the UE receives an assignment of resource dynamically via UL grant or DL assignment, only condition 1 is considered.

Where the UE uses the resource (e.g., SR configuration, SPS/grant-free or measurement configuration such as CSI reference/report) allocated semi-statically via higher layer signaling and/or L1 signaling, both conditions 1 and 2 need to be considered.

Where the resource allocated to the UE may not be used by the dynamic TDD operation, the transmission occasion may be dropped and the resource may be skipped or the transmission occasion may be postponed and the resource may be postponed.

At this time, the UE may perform the following operations considering the reason why the resource may not be used, resource allocation method, and slot aggregation factor.

Method 6-1: In the case of semi-static resource
Method 6-1-1

Where the semi-static resource is rendered invalid for a certain reason, the UE may skip.

This allows only absolute time index to be considered in configuring and using the semi-static resource.

Method 6-1-1-1

Where the semi-static resource is rendered invalid under condition 1-1 (resource direction confliction), the UE may postpone.

This allows the same method to be used between the UE and the base station without considering the reliability of L1 signaling.

At this time, the postponed resource may be a resource designated as UL (or DL) by the semi-static SFI to have the same direction as the direction of the allocated semi-static UL (or DL) resource or a possible UL (DL)d resource, i.e., a resource designated as unknown or UL (or DL) by semi-static SFI.

Method 6-1-2

Where the semi-static resource is periodic, the UE may be operated according to the condition of counting the periodicity for the resource.

In other words, where periodicity is counted when the resource is invalid under a certain condition, transmission may be skipped and, if not counted, transmission may be postponed.

As an example, where periodicity is counted regardless of resource validity, transmission may be skipped regardless of conditions.

As another example, where periodicity is counted only for semi-static UL or unknown, resources corresponding to condition 1-1 may be postponed, and receptions corresponding to the other conditions may be skipped.

This may prevent invasion to the resource allocated in the next period although the resource is postponed when the method is followed.

Method 6-1-3

In method 6-1-3, where slot aggregation is enabled, the same method is used without differentiating between aggregated semi-static resources.

Method 6-1-4

Method 6-1-4 is similar to method 3-2-d described above. Where slot aggregation is enabled, if the first semi-static resource is skipped, the remaining resources are skipped.

Method 6-2: In the case of dynamic resource
Method 6-2-1

The UE may not consider the case where dynamic resource is rendered invalid by a certain condition.

In other words, resources allocated dynamically may be assumed to be valid all the time.

Method 6-2-2

The UE may skip the case where dynamic resource is rendered invalid by a certain condition.

Method 6-2-3

In method 6-2-3, where slot aggregation is enabled, they may be skipped without differentiating between aggregated dynamic resources.

Considering method 6-2-1, the first resource is not skipped but the other resources may be skipped.

Method 6-2-4

Method 6-2-4 is similar to method 3-2-d described above.

In other words, where slot aggregation is enabled, if the first dynamic resource is skipped, the other resources may be skipped as well.

If slot aggregation or repetition is applied in applying the above methods, different methods may be applied to resources explicitly allocated and resources implicitly allocated.

As an example, where PUSCH resource A0 transferred via DCI and PUSCH resources A1, A2, and A3 present in three consecutive slots by slot aggregation factor K=4 are additionally used, different methods may be used for A0 and for [A1, A2, A3].

Specifically, A0 may use method 6-2-1, and the other resources may use method 6-2-2.

The above methods, unless mutually exclusive, may be used together or in combination.

Specifically, when there are consecutively allocated resources [A0, A1, A2, A3], and A0 uses method 6-2-1, and A1, A2, and A3 use method 6-2-2 for repetition counting, method 6-2-4 may be applied additionally.

Upon postponing the resource allocated to the UE by the slot format or to avoid crossing the slot boundary, the time indexes of the resource allocated to the UE and the resource to actually be used may be varied.

At this time, the resource time index may be used to determine the parameter used for the UE's transmission, e.g., HARQ process ID or reception order.

At this time, use of the postponed resource index may result in use of a different parameter than what was intended by the base station.

Thus, although the UE postpones the resource, the index of the resource allocated before postponed may be used as the time resource index used to determine the parameter.

Seventh Implementation

The seventh implementation regards handling overlap between PUSCH/PUCCH resource and SRS transmission.

According to the specifications of SRS transmission, the UE may configure the SRS not to overlap PUSCH transmission.

Given grantless UL data transmission with short periodicity, SRS opportunity may be significantly limited.

Further, the UE may skip PUSCH scheduling by configured grant.

It is unreasonable that the SRS avoids PUSCH scheduling by configured grant.

When PUSCH scheduling and SRS opportunity are in the same slot,
  Where PUSCH scheduling is a configured grant, the SRS resource may overlap the scheduled PUSCH resource.
  The SRS using the resource overlapping PUSCH scheduling may be transmitted only when the UE skips the PUSCH resource.

The overlap may be avoided by a dynamic UL grant with dynamic time-domain.

In some scenarios, it may be very inefficient to avoid overlap between type 1 and 2 resource and SRS-based configuration.

This is why the two configurations restrict the configuration of both the SRS and UL resource configured periodically.

In this sense, described herein are examples of permitting overlapping configuration between type 1/2 resource and SRS.

Where a collision occurs, priority needs to be defined between the two.

Where the SRS resource is shared among multiple UEs, if type 1/2 resource may be skipped in the overlapping resources, it may be better off However, type 1/2 resource may be used for URLLC and, upon collision, it may be considered to drop the SRS.

In either case, unless the configured overlapping resources have type 1/2 transmission, the UE is expected to be able to do SRS transmission.

Where type 1/2 transmission is dropped, it needs to be clarified whether to drop the entire transmission in the overlapping OFDM symbols or partially drop.

Given DM-RS mapping or hopping, it the case of partial or complete overlap with the SRS resource, the issue may be simpler if the entire transmission is dropped.

As information is known by semi-static configuration, the information may be excluded from repetition so that the UE may postpone repetition for the overlapping resources.

When PUSCH scheduling and SRS opportunity are in the same slot,

SRS resource may overlap type 1/2 PUSCH resource.

In the overlapping resources, the overlapping resources are regarded as invalid in terms of type 1/2 given that the SRS resources are shared by multiple UEs.

The UE postpones type 1/2 transmission in the invalid resources including the resource overlapping the SRS.

The UE may transmit periodic or aperiodic sounding reference signaling (SRS) during up to six symbols via dynamic signaling or higher layer signaling from the base station.

Where the allocated PUSCH overlaps the SRS, if the SRS is prioritized, the UE transmits the PUSCH in the other resources than the resource where the SRS is to be transmitted, as possible, and then transmits the SRS.

However, where PUSCH or PUCCH transmission uses periodic or repetition and is non-slot based scheduling, all the allocated resources may be overlapped due to SRS transmission.

In such a case, if the SRS is prioritized, the entire transmission may be canceled due to the SRS, getting repetition or periodicity count in trouble.

To reduce such ambiguity, the following methods may be used.

Method 7-1

In method 7-1, where all or some of the UE's PUSCH/PUCCH transmission symbols are rendered invalid due to SRS transmission, the UE does not perform PUSCH/PUCCH transmission and regards the overlapped symbol as canceled by dynamic TDD operation.

At this time, where repetition or slot aggregation is applied to the transmission, the repetition count is allowed to be the same as that of dynamic TDD.

Given that multiple UEs may be multiplexed for SRS, it may be considered to allow the UE to drop PUSCH or PUCCH transmission for SRS.

Method 7-2

In method 7-2, only when all of the UE's PUSCH/PUCCH transmission symbols are rendered invalid due to SRS transmission, the UE does not perform PUSCH/PUCCH transmission and regards the same as canceled by dynamic TDD operation.

At this time, where repetition or slot aggregation is applied to the transmission, the repetition count is allowed to be the same as that of dynamic TDD.

Where some of the PUSCH/PUCCH transmission symbols are rendered invalid due to SRS transmission, the UE performs PUSCH/PUCCH transmission only in valid, consecutive symbols.

Method 7-3

Where all of the PUSCH/PUCCH transmission symbols are rendered invalid due to SRS transmission, the UE does not perform PUSCH/PUCCH transmission and, if some are valid, the UE performs PUSCH/PUCCH transmission only in valid, consecutive symbols.

At this time, where the resource is indicated/configured as UL regardless of the size of invalid resources due to SRS, repetition is counted all the time.

Method 7-4

Method 7-4 determines last K symbols that should not be used or a symbol range that may be used when the UE applies time domain resource allocation or repetition/aggregation via higher layer signaling or L1 signaling from the base station so as to protect the UE's SRS transmission or other UEs' SRS transmission.

The indication/configuration may be included in the configuration associated with the PUSCH/PUCCH that the UE uses or be included in the SRS configuration, or may be individually configured.

For configured symbols impossible to use, the UE may perform rate-matching on them, regard them as reserved or regard them as resources (e.g., DL resources) with a different transmission direction.

Operations of a UE and a base station for performing SR transmission as described according to implementations of the present disclosure are described below based on what has been described above.

Figure 12:
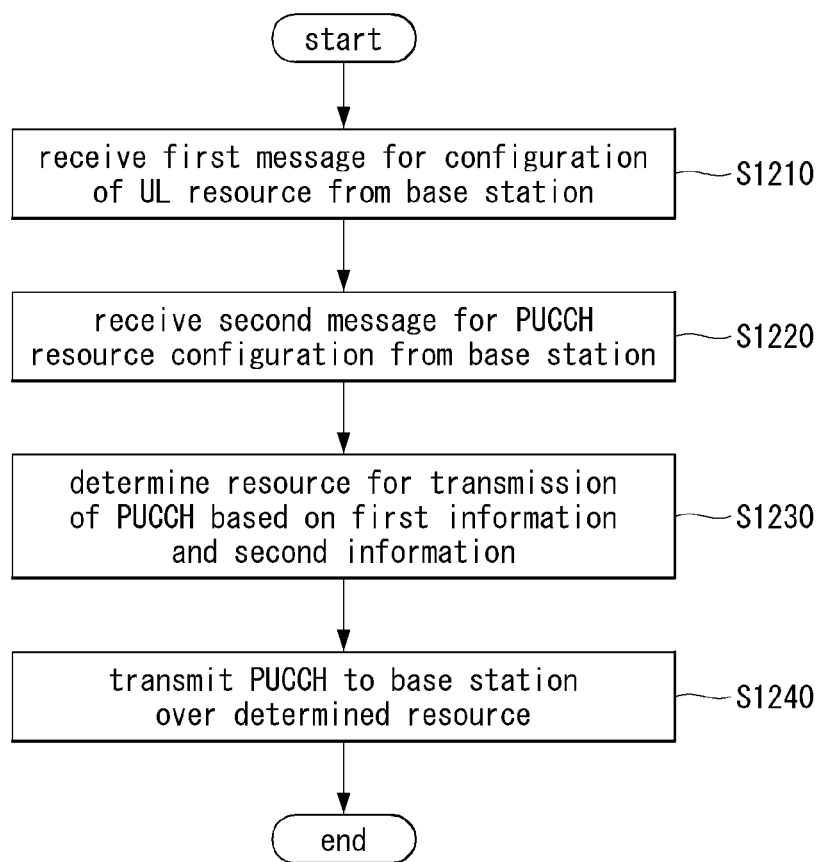
FIG. 12 is a flowchart illustrating an example of operations of a UE according to implementations of the present disclosure.

FIG. 12 is a flowchart illustrating an example of operations of a UE according to implementations of the present disclosure.

In particular, FIG. 12 illustrates an example of a UE transmitting a physical uplink control channel (PUCCH) carrying a scheduling request (SR) in a wireless communication system.

First, the UE receives, from the base station, a first message for uplink (UL) resource configuration (S1210).

Here, the first message includes first information for a symbol location (e.g., a symbol level offset, or starting symbol) of a UL transmission.

The UE receives, from the base station, a second message for resource configuration of a PUCCH which carries the SR (S1220).

Here, the second message includes second information for periodicity and offset for transmission of the PUCCH which carries the SR.

The UE determines a resource for transmission of the PUCCH carrying the SR, based on the first information and the second information (S1230).

In some implementations, if the transmission periodicity (determined from the second information regarding the PUCCH which carries the SR) is smaller than a duration of one slot, then a symbol location for the PUCCH which carries the SR may be determined based on the value of the first information (the symbol location of the UL transmission).

For example, in this case, the position of the transmission start symbol of the PUCCH may be set to the value of the first information, and the symbol location of the SR on the PUCCH may be determined relative to the start symbol of the PUCCH.

The UE then transmits, to the base station, the PUCCH carrying the SR in the determined resource (S1240).

Where a specific slot has an insufficient number of symbols available for PUCCH transmission, the UE refrains from transmitting the PUCCH in the specific slot.

The periodicity of the PUCCH may be 2 symbols or 7 symbols.

The PUCCH may be PUCCH format 0 or PUCCH format 1.

The position of the symbol at which the PUCCH carrying the SR transmission starts may be set to differ per slot.

Implementation, in a UE, of techniques as described according to implementations of the present disclosure is described below with reference to FIGS. 12, 14, and 15.

A UE for transmitting a physical uplink control channel (PUCCH) carrying a scheduling request (SR) in a wireless communication system may include a radio frequency (RF) module for transmitting/receiving radio signals and a processor functionally connected with the RF module.

The processor of the UE controls the RF module to receive a first message for uplink (UL) resource configuration from the base station.

The first message may include first information for symbol level offset of UL transmission.

The processor of the UE controls the RF module to receive a second message for resource configuration of PUCCH from the base station.

The second message may include second information for periodicity and offset for transmission of PUCCH.

The processor of the UE determines a resource for transmission of PUCCH based on the first information and the second information.

Where the transmission periodicity of PUCCH is smaller than one slot, the symbol at which the PUCCH transmission begins may be the value of the first information.

That is, in this case, the position of the transmission start symbol of the PUCCH may be set to the value of the first information.

The processor of the UE controls the RF module to transmit the PUCCH to the base station over the determined resource.

Where a specific slot has an insufficient number of symbols available for PUCCH transmission, the processor of the UE controls the RF module to refrain from transmitting the PUCCH in the specific slot.

The periodicity of the PUCCH may be 2 symbols or 7 symbols.

The PUCCH may be PUCCH format 0 or PUCCH format 1.

The position of the symbol at which the PUCCH transmission starts may be set to differ per slot.

Figure 13:
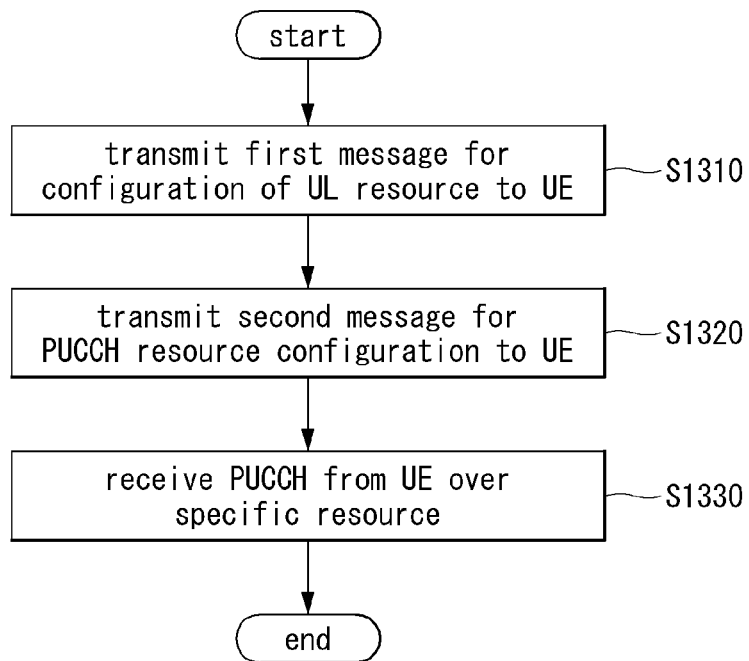
FIG. 13 is a flowchart illustrating an example of operations of a base station according to implementations of the present disclosure.

FIG. 13 is a flowchart illustrating an example of operations of a base station according to implementations of the present disclosure.

In particular, FIG. 13 illustrates an example of a base station receiving a physical uplink control channel (PUCCH) carrying a scheduling request (SR) in a wireless communication system.

First, the base station transmits a first message for uplink (UL) resource configuration to the UE (S1310).

Here, the first message includes first information for symbol level offset of UL transmission.

The base station transmits a second message for resource configuration of PUCCH to the UE (S1320).

Here, the second message includes second information for periodicity and offset for transmission of PUCCH.

The base station receives the PUCCH from the UE over a specific resource (S1330).

The specific resource may be determined for transmission of PUCCH based on the first information and the second information Where the transmission periodicity of PUCCH is smaller than one slot, the symbol at which the PUCCH transmission begins may be the value of the first information.

That is, in this case, the position of the transmission start symbol of the PUCCH may be set to the value of the first information.

Where a certain slot has an insufficient number of symbols available for PUCCH transmission, the base station refrains from receiving the PUCCH in the certain slot.

The periodicity of the PUCCH may be 2 symbols or 7 symbols.

The PUCCH may be PUCCH format 0 or PUCCH format 1.

The position of the symbol at which the PUCCH transmission starts may be set to differ per slot.

Implementation, in a base station, of techniques as described according to implementations of the present disclosure is described below with reference to FIGS. 13 to 15.

A base station for receiving a physical uplink control channel (PUCCH) carrying a scheduling request (SR) in a wireless communication system may include a radio frequency (RF) module for transmitting/receiving radio signals and a processor functionally connected with the RF module.

The processor of the base station controls the RF module to transmit a first message for uplink (UL) resource configuration to the UE.

Here, the first message includes first information for symbol level offset of UL transmission.

The processor of the base station controls the RF module to transmit a second message for resource configuration of PUCCH to the UE.

Here, the second message includes second information for periodicity and offset for transmission of PUCCH.

The processor of the base station controls the RF module to receive the PUCCH from the UE over a specific resource.

The specific resource may be determined for transmission of PUCCH based on the first information and the second information Where the transmission periodicity of PUCCH is smaller than one slot, the symbol at which the PUCCH transmission begins may be the value of the first information.

That is, in this case, the position of the transmission start symbol of the PUCCH may be set to the value of the first information.

Where a certain slot has an insufficient number of symbols available for PUCCH transmission, the processor of the base station controls the RF module to refrain from receiving the PUCCH in the certain slot.

The periodicity of the PUCCH may be 2 symbols or 7 symbols.

The PUCCH may be PUCCH format 0 or PUCCH format 1.

The position of the symbol at which the PUCCH transmission starts may be set to differ per slot.

Devices to which the Disclosure May Apply

Figure 14:
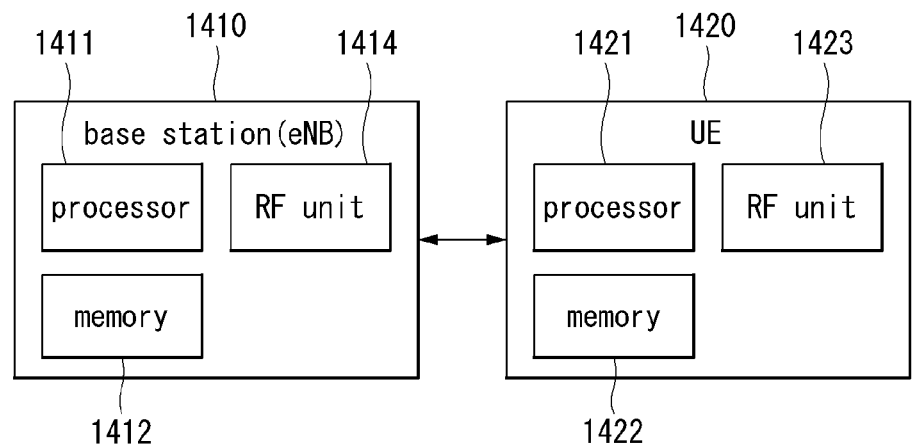
FIG. 14 is a block diagram illustrating an example of a configuration of a wireless communication device according to implementations of the present disclosure.

FIG. 14 is a block diagram illustrating an example of a configuration of a wireless communication device according to implementations of the present disclosure.

Referring to FIG. 14, a wireless communication system includes a base station 1410 and a plurality of UEs 1420 positioned in the coverage of the base station 1410.

The base station and the UE each may be represented as a wireless device.

The base station includes a processor 1411, a memory 1412, and a radio frequency (RF) module 1413. The processor 1411 implements the functions, processes or steps, and/or methods described above in connection with FIGS. 1 to 13. Wireless interface protocol layers may be implemented by the processor. The memory is connected with the processor and stores various pieces of information for driving the processor. The RF module is connected with the processor and transmits and/or receives wireless signals.

The UE includes a processor 1421, a memory 1422, and an RF module 1423.

The processor implements the functions, processes or steps, and/or methods described above in connection with FIGS. 1 to 13. Wireless interface protocol layers may be implemented by the processor. The memory is connected with the processor and stores various pieces of information for driving the processor. The RF module is connected with the processor and transmits and/or receives wireless signals.

The memory 1412 and 1422 may be positioned inside or outside the processor 1411 and 1421 and be connected with the processor 1411 and 1421 via various known means.

The base station and/or the UE may include a single or multiple antennas.

The antenna 1414 and 1424 functions to transmit and receive wireless signals.

Figure 15:
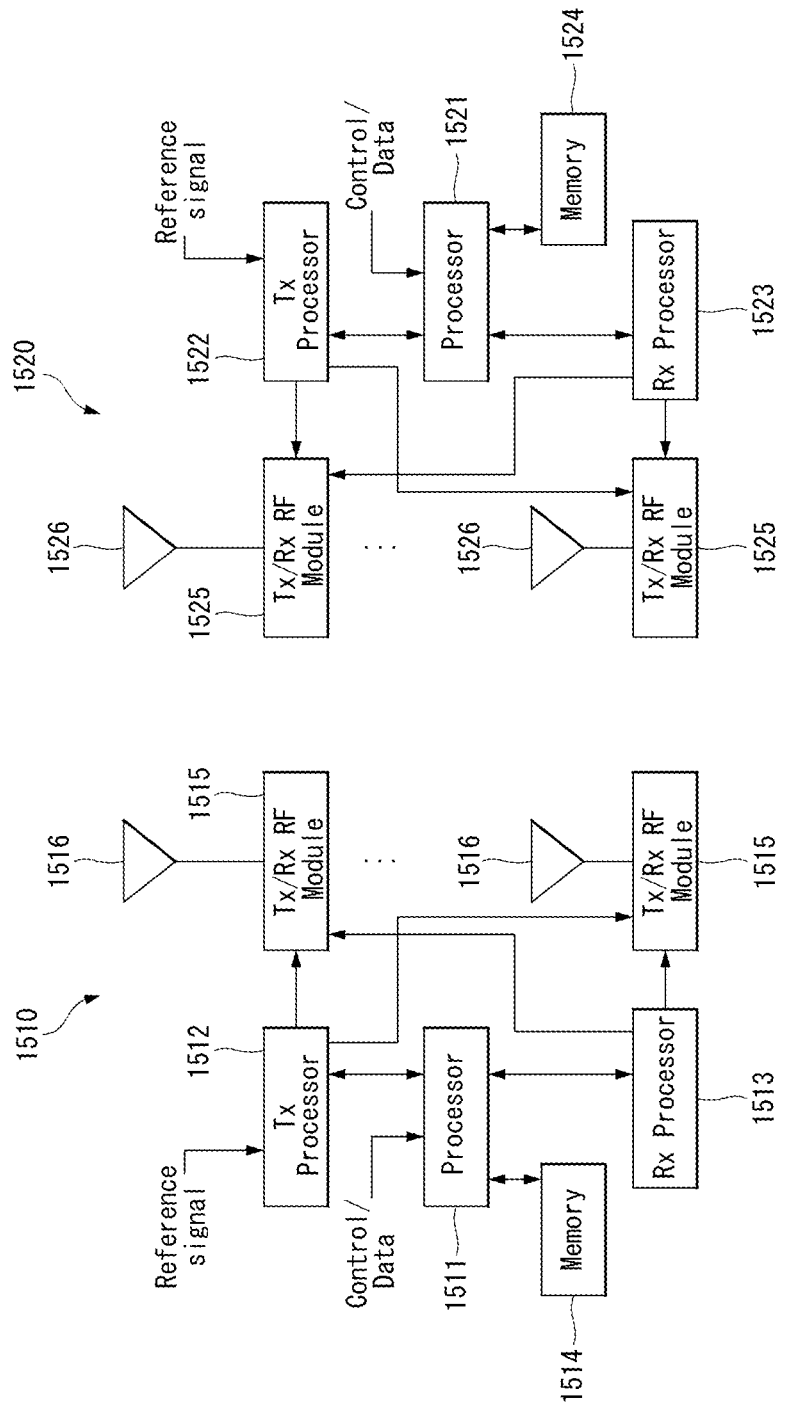
FIG. 15 is a block diagram illustrating another example of a configuration of a wireless communication device according to implementations of the present disclosure.

FIG. 15 is a block diagram illustrating another example of a configuration of a wireless communication device according to implementations of the present disclosure.

Referring to FIG. 15, a wireless communication system includes a base station 1510 and a plurality of UEs 1520 positioned in the coverage of the base station 1510. The base station may be represented as a transmitter, and the UE as a receiver, and vice versa. The base station and UE include processors 1511 and 1521, memories 1514 and 1524, one or more Tx/Rx radio frequency (RF) modules 1515 and 1525, Tx processors 1512 and 1522, Rx processors 1513 and 1523, and antennas 1516 and 1526. The processor implements the above-described functions, processes, and/or methods. Specifically, on DL (communication from the base station to the UE), higher layer packets are provided from a core network to the processor 1511. The processor implements L2 layer functions. On DL, the processor is in charge of multiplexing between the logical channel and transport channel, radio resource allocation for the UE, and signaling to the UE. The Tx processor 1512 implements various signal processing functions on the L1 layer (i.e., the physical layer). The signal processing functions allow for easier forward error correction (FEC) in the UE and include coding and interleaving. Coded and modulated symbols are split into parallel streams, and each stream is mapped to an OFDM subcarrier, is multiplexed with a reference signal (RS) in the time and/or frequency domain, and they are then merged together by inverse fast Fourier transform (IFFT), thereby generating a physical channel for carrying time domain OFDMA symbol streams. The OFDM streams are spatially precoded to generate multiple spatial streams. Each spatial stream may be provided to a different antenna 1516 via an individual Tx/Rx module (or transceiver 1515). Each Tx/Rx module may modulate the RF carrier into each spatial stream for transmission. In the UE, each Tx/Rx module (or transceiver 1525) receives signals via its respective antenna 1526. Each Tx/Rx module reconstructs the information modulated with the RF carrier and provides the reconstructed signal or information to the Rx processor 1523. The Rx processor implements various signal processing functions of layer 1. The Rx processor may perform spatial processing on the information for reconstructing any spatial stream travelling to the UE. Where multiple spatial streams travel to the UE, they may be merged into a single OFDMA symbol stream by multiple Rx processors. The Rx processor transforms the OFDMA symbol stream from the time domain to frequency domain using fast Fourier transform (FFT). The frequency domain signal includes an individual OFDMA symbol stream for each subcarrier of the OFDM signal. The reference signal and symbols on each subcarrier are reconstructed and demodulated by determining signal array points that are most probable as transmitted from the baseband signal. Such soft decisions may be based on channel estimations. Soft decisions are decoded and deinterleaved to reconstruct the original data and control signal transmitted by the base station on the physical channel. The data and control signal are provided to the processor 1521.

UL (communication from the UE to the base station) is handled by the base station 1510 in a similar manner to those described above in connection with the functions of the receiver in the UE 1520. Each Tx/Rx module 1525 receives signals via its respective antenna 1526. Each Tx/Rx module provides RF carrier and information to the Rx processor 1523. The processor 1521 may be related to the memory 1524 that stores program code and data. The memory may be referred to as a computer readable medium.

The aforementioned implementations are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the implementations of the present disclosure. The order of operations described in the implementations of the present disclosure may be changed. Some structural elements or features of one implementation may be included in another implementation, or may be replaced with corresponding structural elements or features of another implementation. Moreover, it is apparent that some claims referring to specific claims may be combined with another claims referring to the other claims other than the specific claims to constitute the implementation or add new claims by means of amendment after the application is filed.

The implementation of the present disclosure may be achieved by various means, for example, hardware, firmware, software, or a combination thereof. In a hardware configuration, the methods according to the implementations of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

Although the disclosure has been shown and described in connection with examples applied to 3GPP LTE/LTE-A systems, the disclosure may also be applicable to other various wireless communication systems than 3GPP LTE/LTE-A systems.

What is claimed is:

1. A method performed by a user equipment (UE) in a wireless communication system, the method comprising:
   receiving, from a base station, configuration information related to configured grant; and
   performing physical uplink shared channel (PUSCH) transmissions that are semi-statically configured based on the configuration information,
   wherein the configuration information includes a first parameter indicating a slot number and a second parameter indicating a PUSCH number that are applied in the PUSCH transmissions,
   wherein the slot number indicates a first number of consecutive slots allocated to the PUSCH transmissions within a configured grant period, and
   wherein the PUSCH number indicates a second number of consecutive PUSCH allocations within a slot.

2. The method of claim 1, wherein the performing the PUSCH transmissions comprises,
   transmitting the second number of consecutive PUSCHs during each of the first number of consecutive slots.

3. The method of claim 1, where, in case that a duration of a slot is shorter than a duration required to perform the second number of consecutive PUSCH transmissions within the slot, the configured grant is considered by the UE as invalid.

4. The method of claim 1, where, in case that a duration of a slot is shorter than a duration required to perform the second number of consecutive PUSCH transmissions within the slot, a third number of consecutive PUSCH transmissions are performed within the slot, the third number being less than the second number.

5. The method of claim 1, where, in case that a duration of a slot is shorter than a duration required to perform the second number of consecutive PUSCH transmissions within the slot, the second number of consecutive PUSCH transmissions are performed within more than one slot.

6. A user equipment (UE) configured to operate in a wireless communication system, the UE comprising:
   a transceiver; and
   at least one processor; and
   at least one computer memory operably connected to the at least one processor and storing instructions that, based on being executed by the at least one processor, perform operations comprising:
   receiving, from a base station via the transceiver, configuration information related to configured grant; and
   performing physical uplink shared channel (PUSCH) transmissions that are semi-statically configured, via the transceiver, based on the configuration information,
   wherein the configuration information includes a first parameter indicating a slot number and a second parameter indicating a PUSCH number that are applied in the PUSCH transmissions,
   wherein the slot number indicates a first number of consecutive slots allocated to the PUSCH transmissions within a configured grant period, and
   wherein the PUSCH number indicates a second number of consecutive PUSCH allocations within a slot.

7. The UE of claim 6, wherein the performing the PUSCH transmissions comprises,
   transmitting the second number of consecutive PUSCHs during each of the first number of consecutive slots.

8. The UE of claim 6, where, in case that a duration of a slot is shorter than a duration required to perform the second number of consecutive PUSCH transmissions within the slot, the configured grant is considered by the UE as invalid.

9. The UE of claim 6, where, in case that a duration of a slot is shorter than a duration required to perform the second number of consecutive PUSCH transmissions within the slot, a third number of consecutive PUSCH transmissions are performed within the slot, the third number being less than the second number.

10. The UE of claim 6, where, in case that a duration of a slot is shorter than a duration required to perform the second number of consecutive PUSCH transmissions within the slot, the second number of consecutive PUSCH transmissions are performed within more than one slot.

11. A processing device configured to control a user equipment (UE) to operate in a wireless communication system, the processing device comprising:
    at least one processor; and
    at least one computer memory operably connected to the at least one processor and storing instructions that, based on being executed by the at least one processor, perform operations comprising:
    receiving, from a base station, configuration information related to configured grant that is configured by the base station; and
    performing physical uplink shared channel (PUSCH) transmissions that are semi-statically configured based on the configuration information,
    wherein the configuration information includes a first parameter indicating a slot number and a second parameter indicating a PUSCH number that are applied in the PUSCH transmissions,
    wherein the slot number indicates a first number of consecutive slots allocated to the PUSCH transmissions within a configured grant period, and
    wherein the PUSCH number indicates a second number of consecutive PUSCH allocations within a slot.

* * * * *